US012026430B2

(12) United States Patent
Shimizu et al.

(10) Patent No.: US 12,026,430 B2
(45) Date of Patent: Jul. 2, 2024

(54) INFORMATION PROCESSING DEVICE, INFORMATION PROCESSING METHOD, AND PROGRAM

(71) Applicant: SONY GROUP CORPORATION, Tokyo (JP)

(72) Inventors: Junichi Shimizu, Tokyo (JP); Kei Takahashi, Tokyo (JP); Junichi Nagahara, Tokyo (JP); Manabu Fujiki, Tokyo (JP); Tomohiro Imura, Tokyo (JP); Keiichi Kitahara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 280 days.

(21) Appl. No.: 17/442,018

(22) PCT Filed: Mar. 16, 2020

(86) PCT No.: PCT/JP2020/011333
§ 371 (c)(1),
(2) Date: Sep. 22, 2021

(87) PCT Pub. No.: WO2020/203208
PCT Pub. Date: Oct. 8, 2020

(65) Prior Publication Data
US 2022/0179613 A1 Jun. 9, 2022

(30) Foreign Application Priority Data

Mar. 29, 2019 (JP) .................................. 2019-067394

(51) Int. Cl.
G06F 3/16 (2006.01)
G06F 3/01 (2006.01)
(Continued)

(52) U.S. Cl.
CPC ........... *G06F 3/165* (2013.01); *H04R 1/1041* (2013.01); *G06F 3/017* (2013.01); *G06F 3/03547* (2013.01); *H04R 2430/01* (2013.01)

(58) Field of Classification Search
CPC ......... G10L 15/26; G10L 15/00; G10K 15/04; H04R 1/1008; H04R 1/1041;
(Continued)

(56) References Cited

U.S. PATENT DOCUMENTS

2016/0150207 A1* 5/2016 Zheng ...................... H04S 1/00
386/227
2020/0219468 A1* 7/2020 Wu ...................... A61B 5/7445

FOREIGN PATENT DOCUMENTS

JP 2000-285378 A 10/2000
JP 2016-051288 A * 4/2016 ............. B60R 16/02
(Continued)

*Primary Examiner* — Lun-See Lao
(74) *Attorney, Agent, or Firm* — Paratus Law Group, PLLC

(57) ABSTRACT

Provided is an information processing device and an information processing method, the information processing device including a control unit that, on the basis of a position of a recognized operation object, dynamically controls output of an information associated with at least one operation region in which the recognized operation object is located, the control unit being configured to, in a case where the recognized operation object is located in the operation region, control execution of a device function corresponding to the operation region in which the recognized operation object is located, and the operation region including a region incapable of being visually recognized by a user.

15 Claims, 24 Drawing Sheets

(51) Int. Cl.
*G06F 3/0354* (2013.01)
*H04R 1/10* (2006.01)

(58) Field of Classification Search
CPC .... H04R 2430/01; H04N 7/142; H04N 7/147;
H04N 7/165; H04S 7/304; H04S 7/40;
H04W 4/026; H04W 4/33; H04W 4/40
USPC .............................. 381/74, 104–106; 700/94
See application file for complete search history.

(56) References Cited

FOREIGN PATENT DOCUMENTS

| JP | 2016-136722 A | * | 7/2016 | ............... H04R 1/10 |
| JP | 2016-136722 A | | 7/2016 | |
| WO | WO 2012/165868 A3 | * | 12/2012 | ............. G06F 3/041 |
| WO | WO 2018/049617 A1 | | 3/2018 | |

* cited by examiner

FIG.3
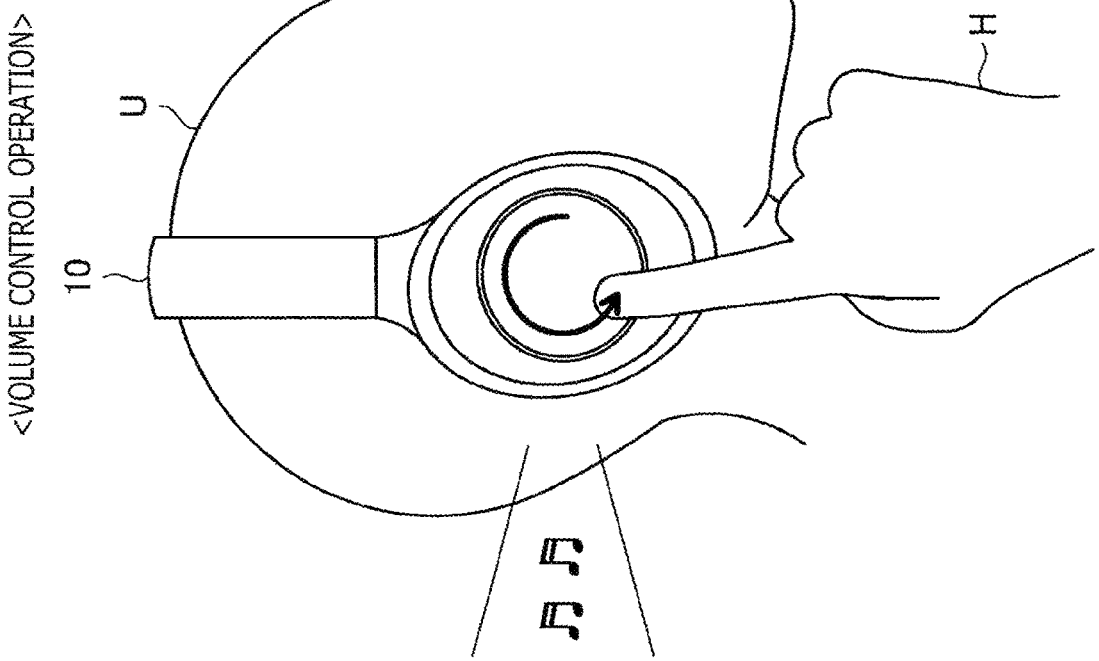
<MUSIC FAST-FORWARD OPERATION>
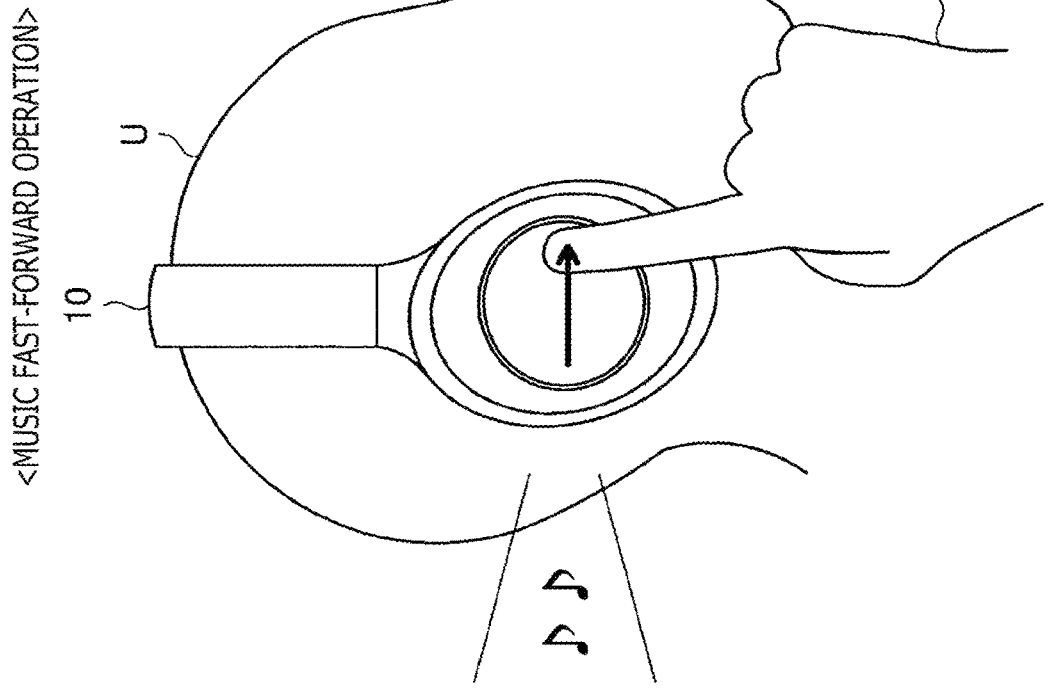
<VOLUME CONTROL OPERATION>

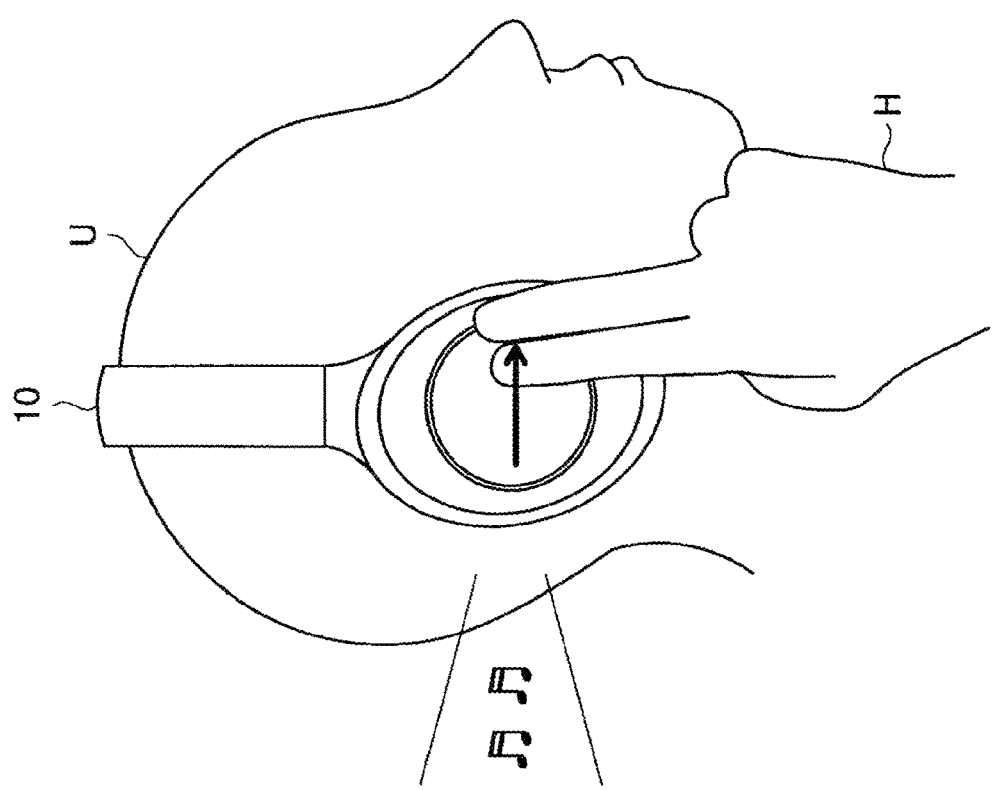
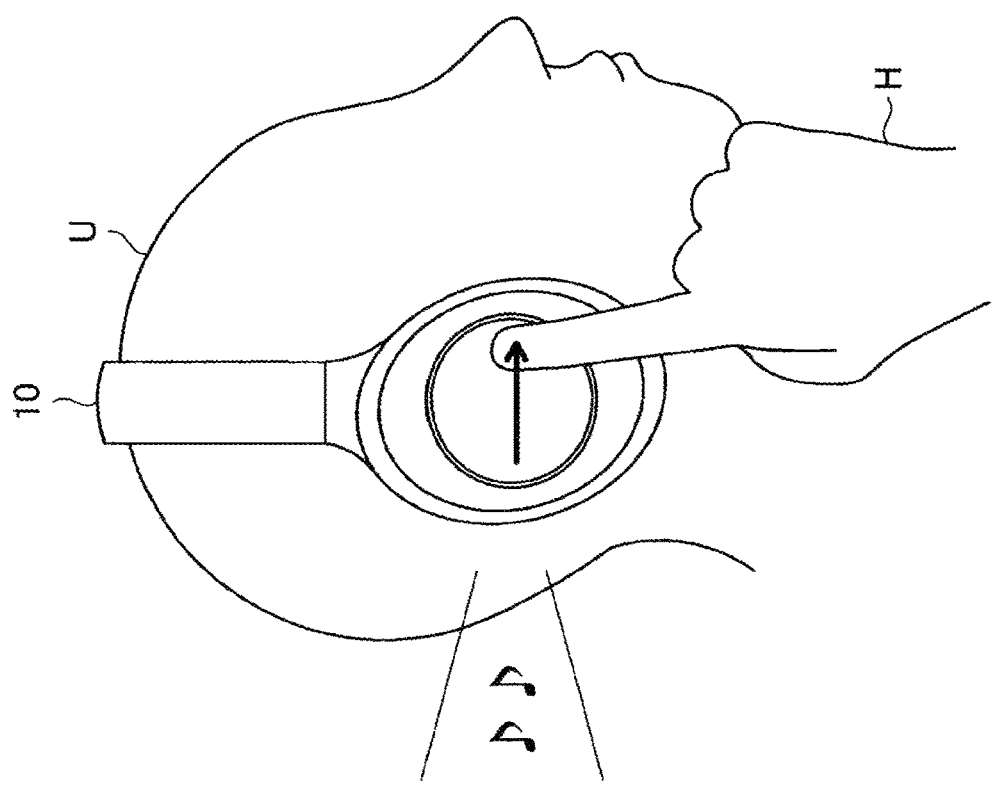
FIG. 4

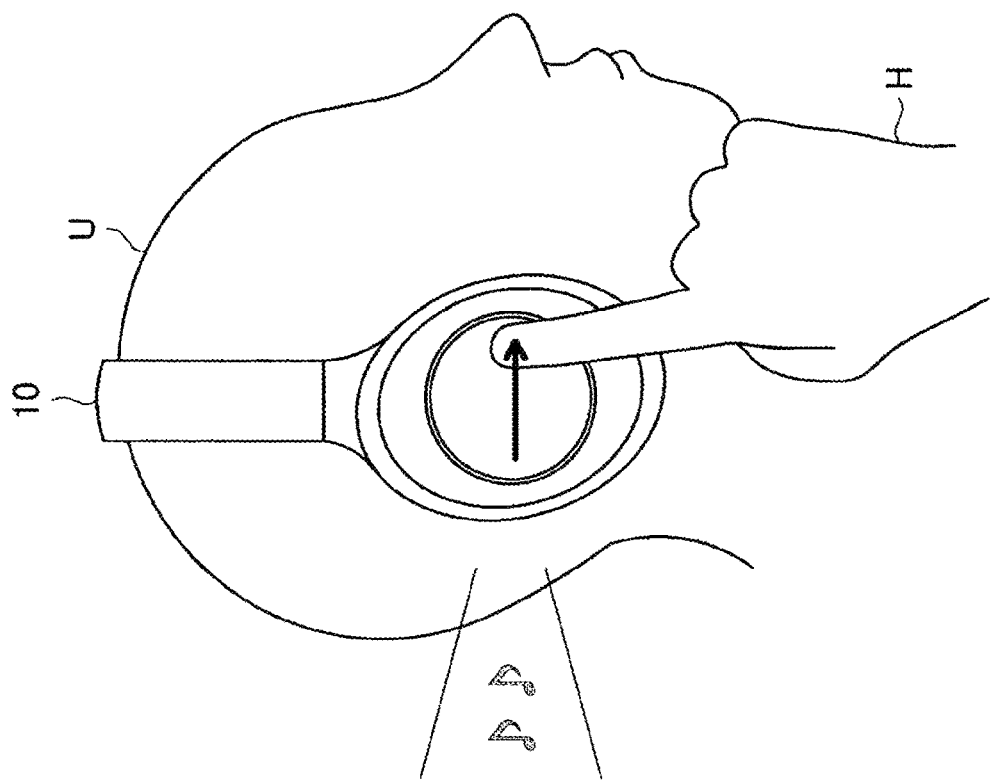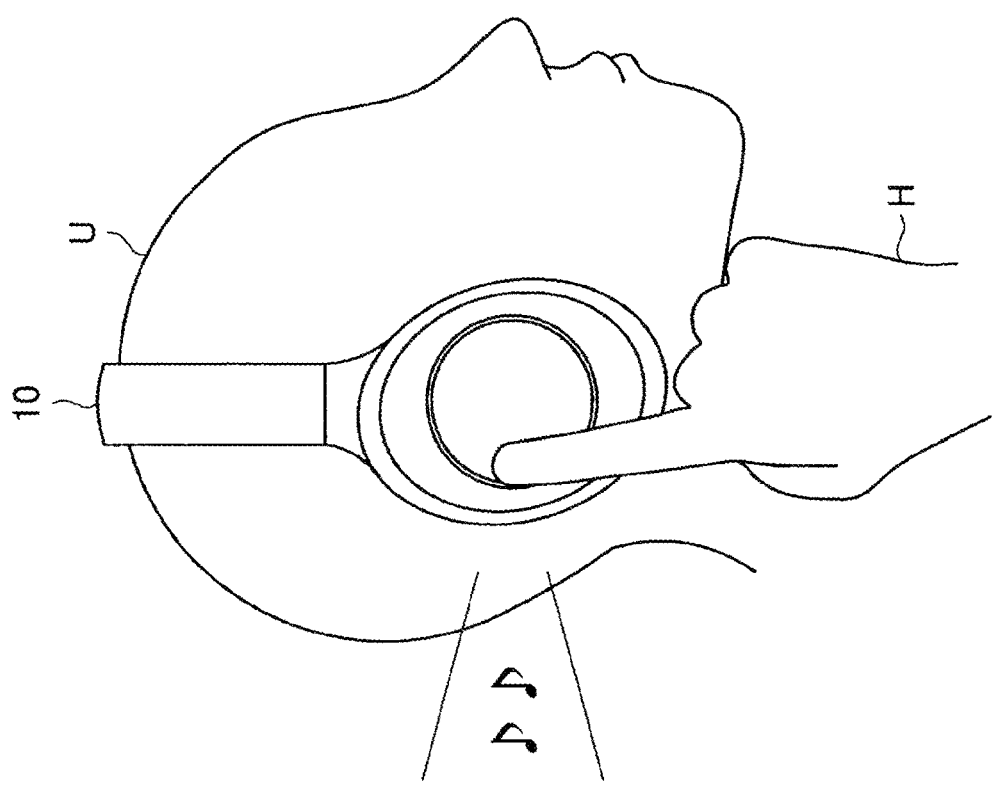
FIG. 6

FIG. 8
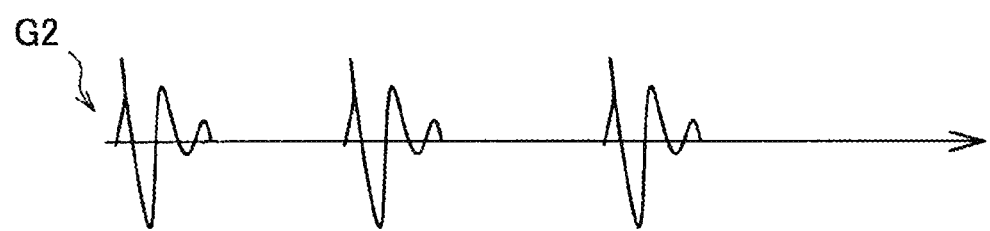
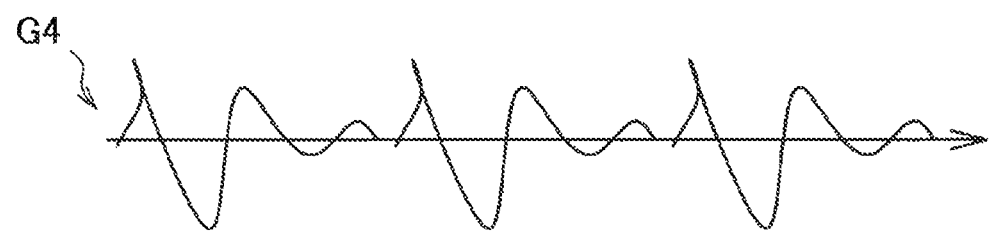

FIG. 9
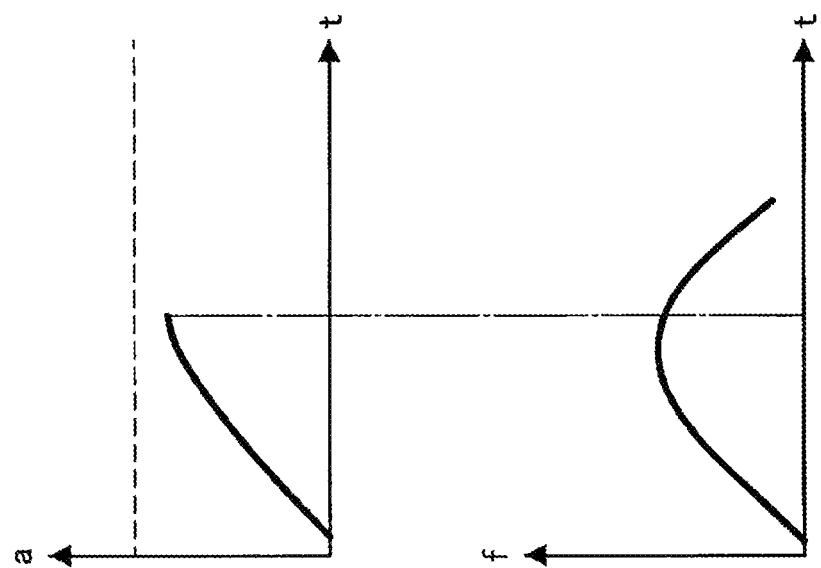
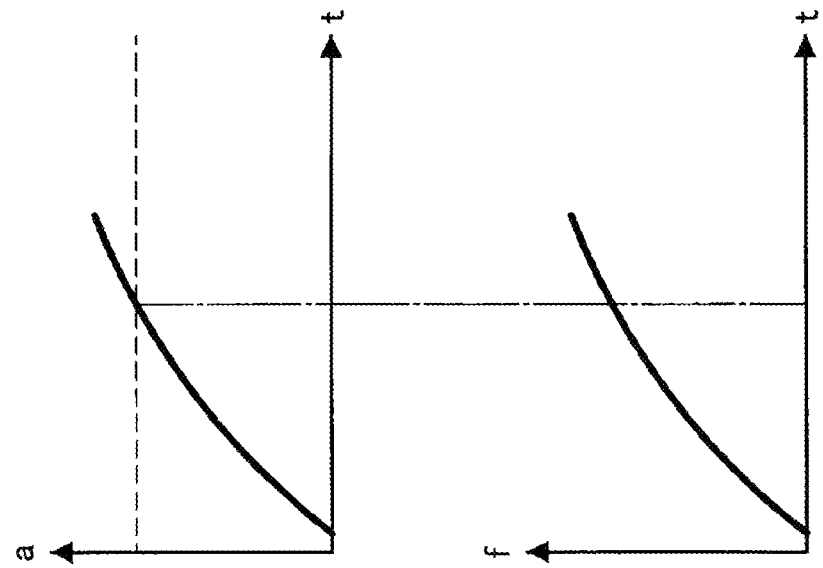

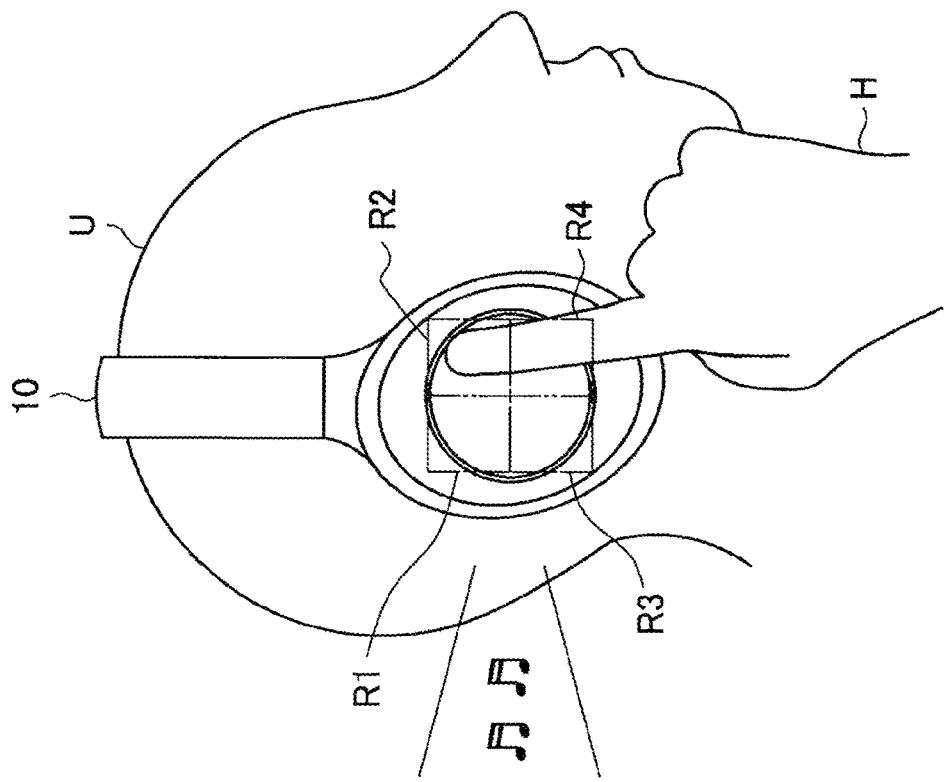
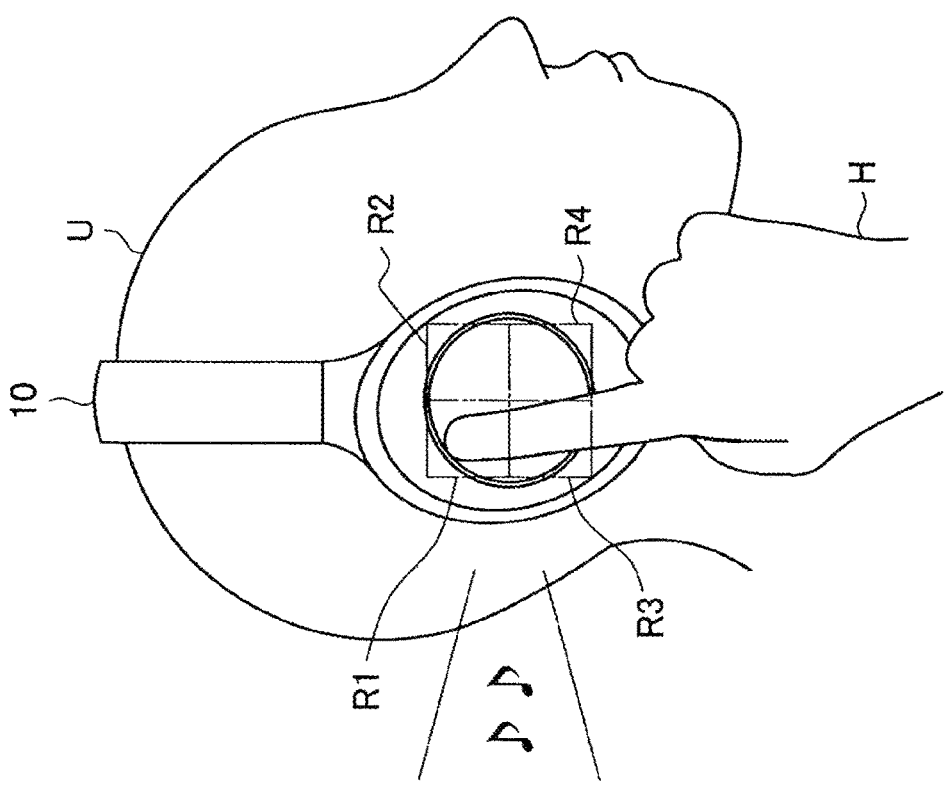
FIG. 11

FIG. 12
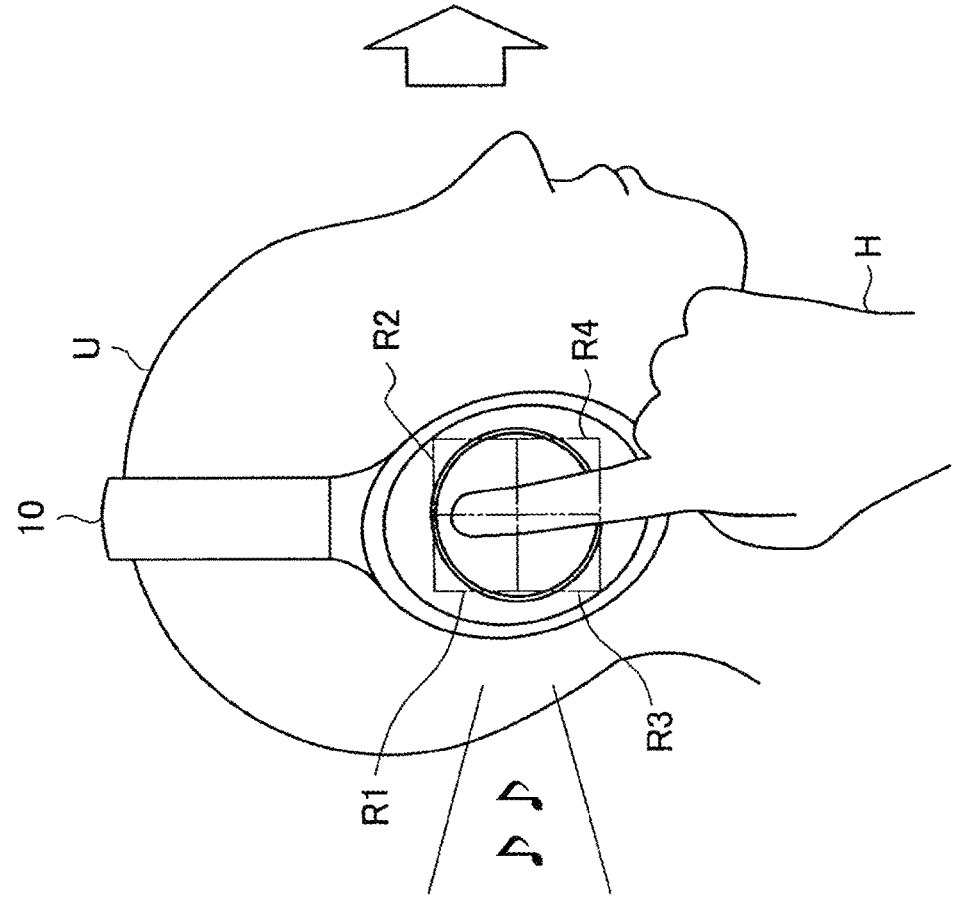
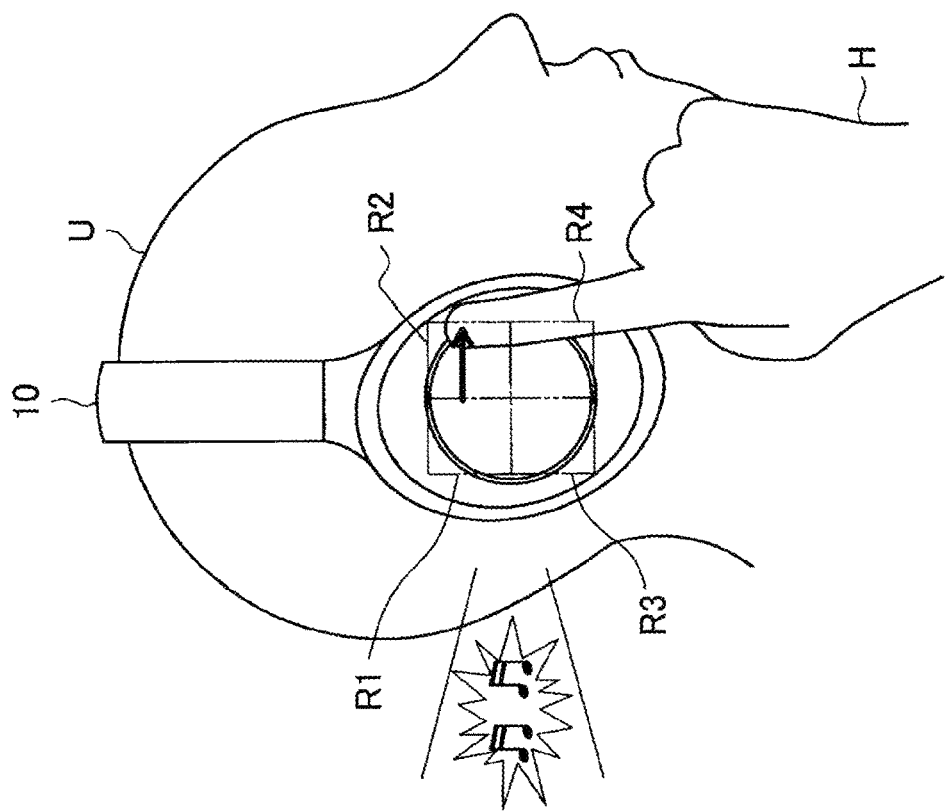

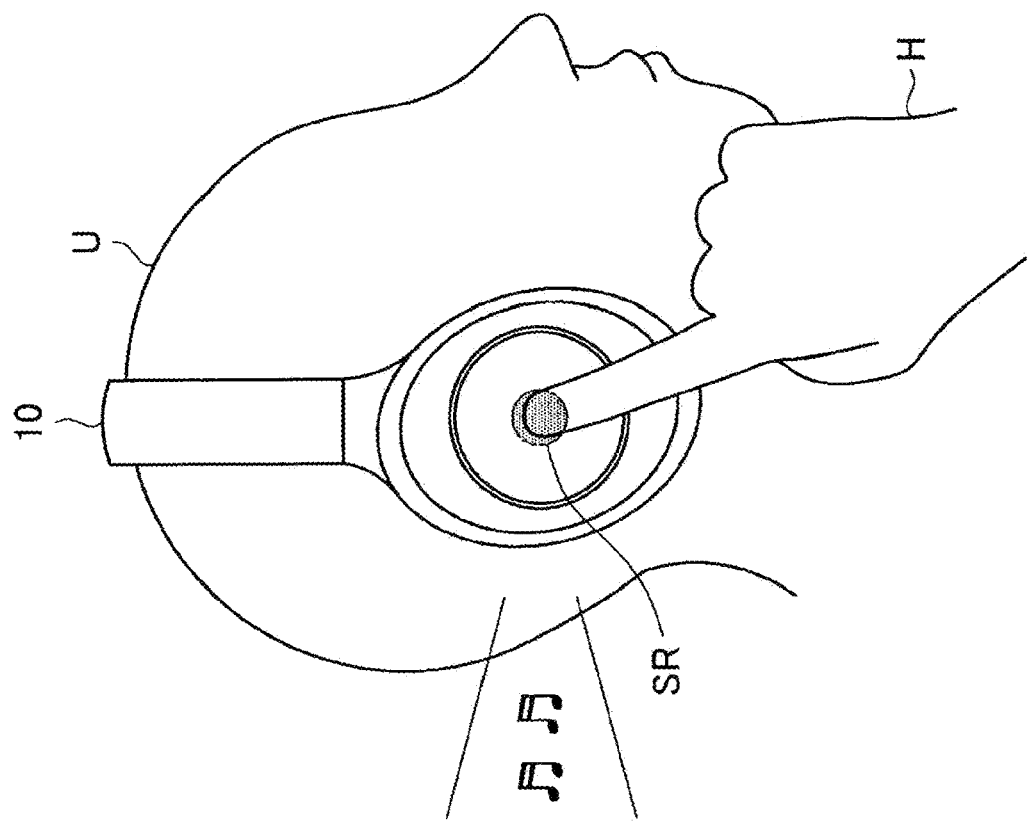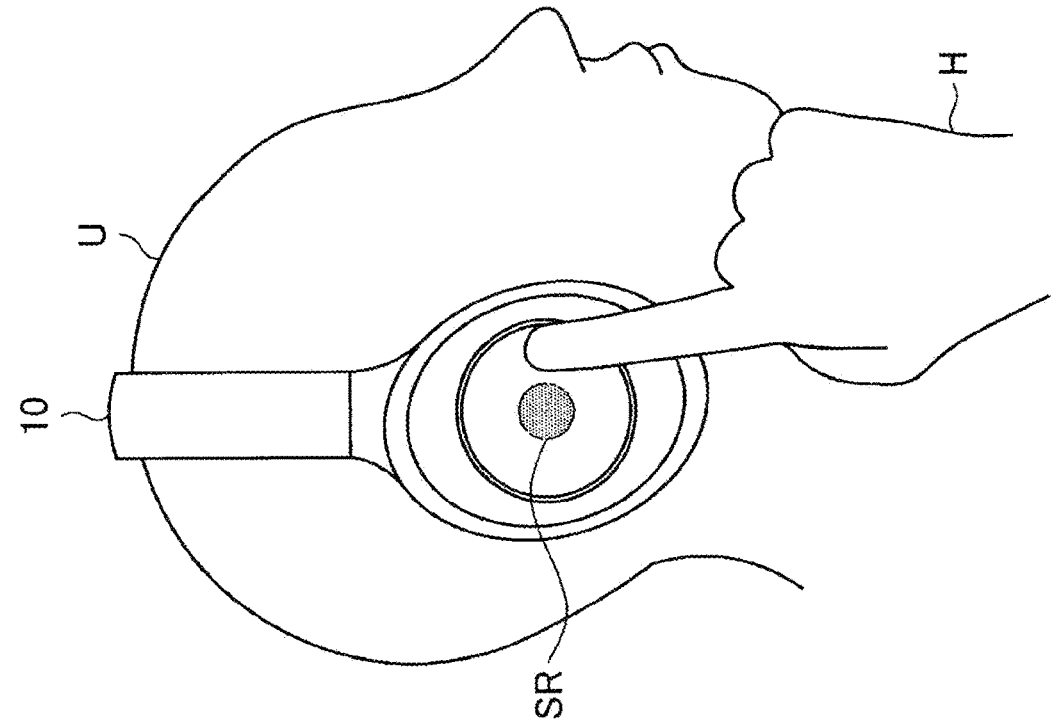
FIG. 16

FIG. 17
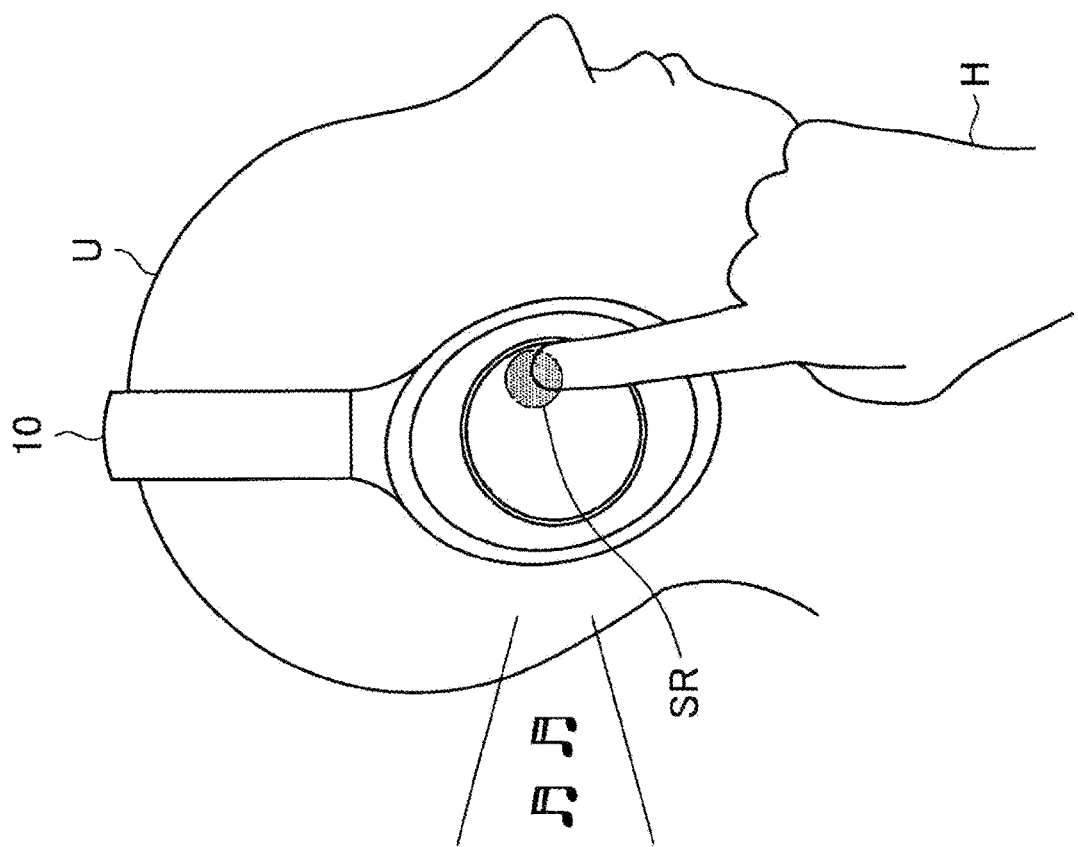
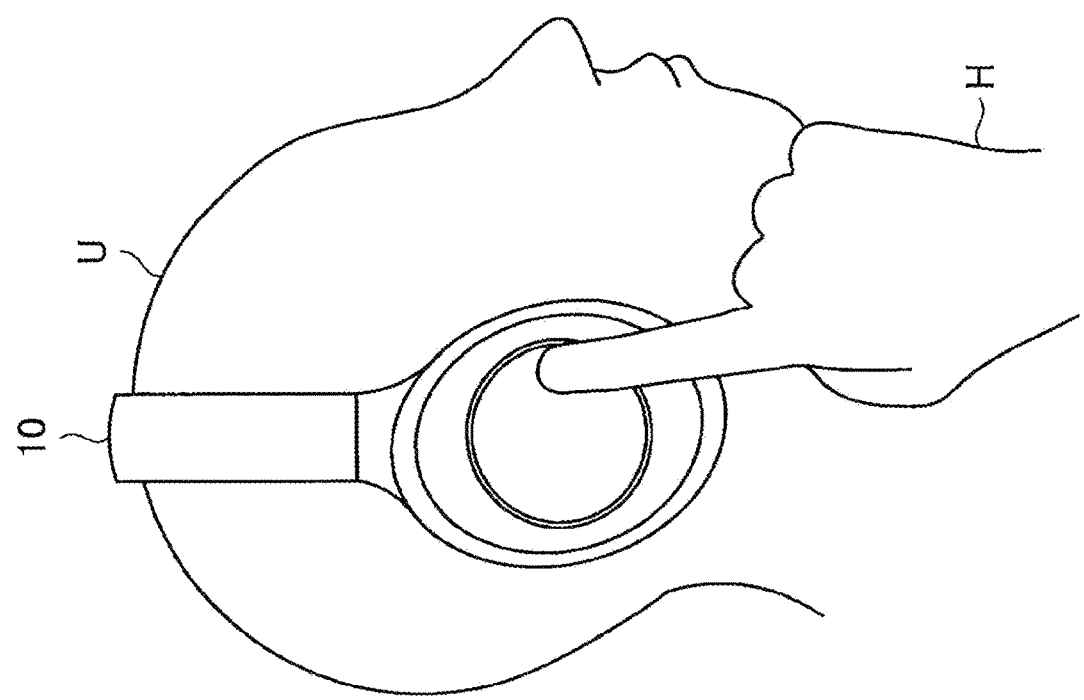

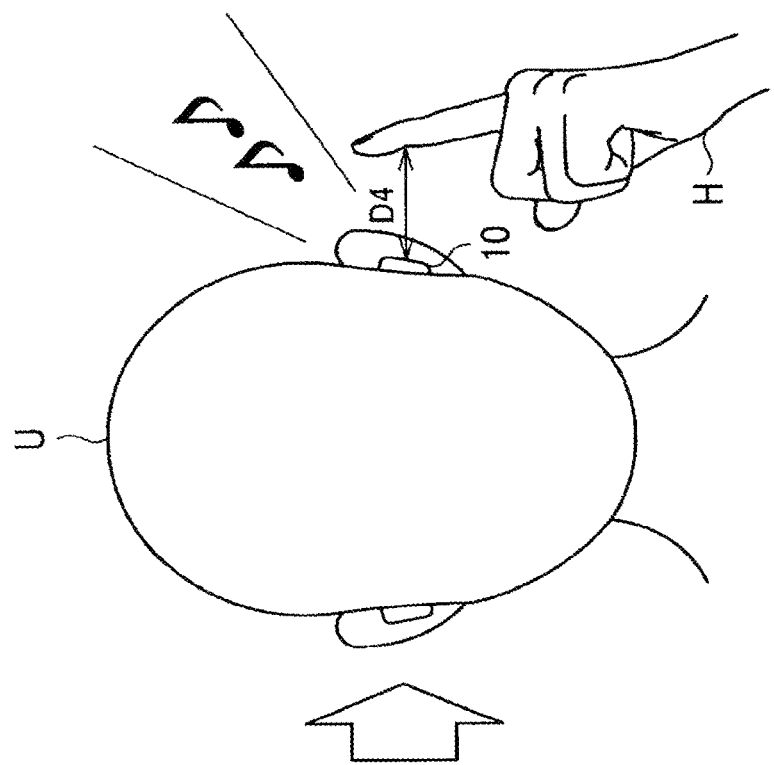
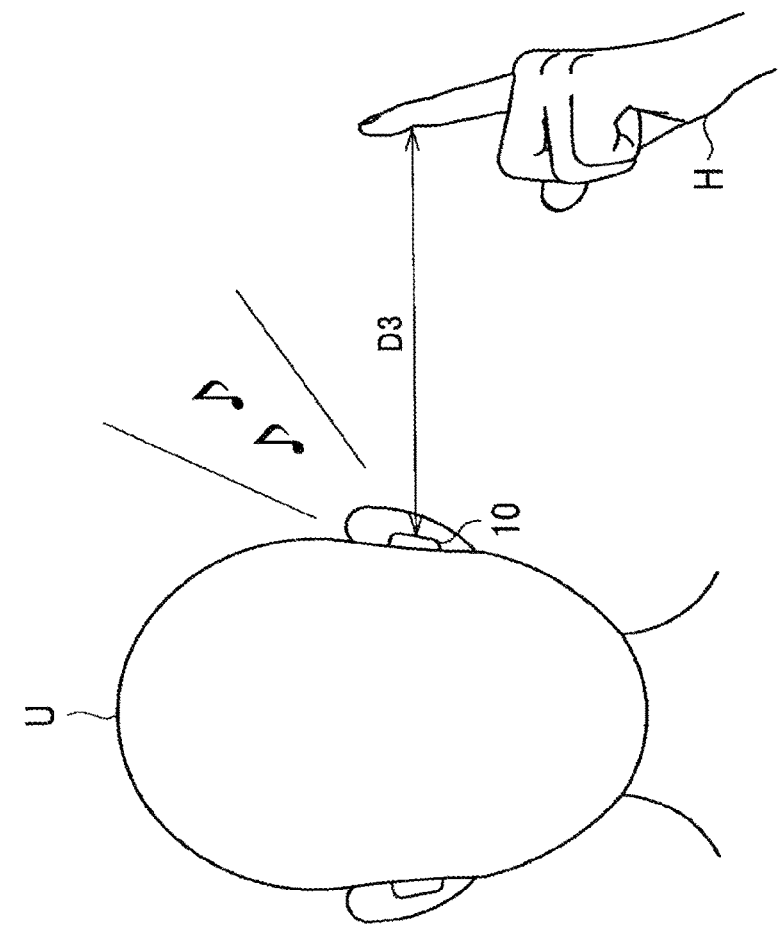
FIG.19

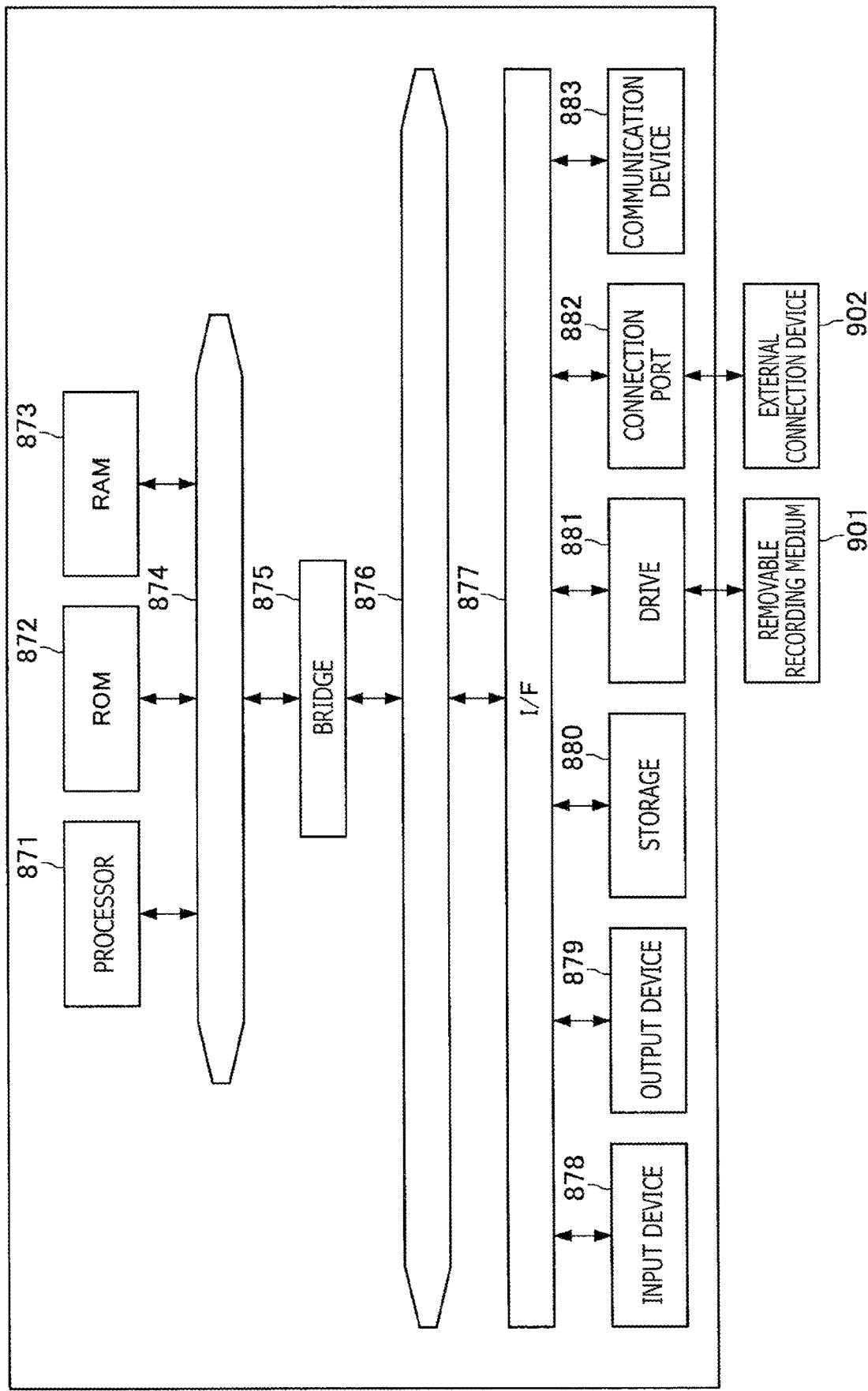

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2020/011333 (filed on Mar. 16, 2020) under 35 U.S.C. § 371, which claims priority to Japanese Patent Application No. 2019-067394 (filed on Mar. 29, 2019), which are all hereby incorporated by reference in their entirety.

TECHNICAL FIELD

The present disclosure relates to an information processing device, an information processing method, and a program.

BACKGROUND ART

In recent years, technology has been developed for causing a device to output sounds to notify a user of information regarding regions. For example, in PTL 1, there is disclosed technology for guiding a user by notifying the user of region information to be used as a movement route for the user by using sound waves emitted from sound source devices.

CITATION LIST

Patent Literature

[PTL 1]
Japanese Patent Laid-open No. 2000-285378

SUMMARY

Technical Problem

Meanwhile, in a case where a user performs an operation for a device in a region that the user is unable to visually recognize, a situation may arise in which it is difficult for the user to confirm whether or not the operation is being correctly performed at an intended portion in the region. In the technology written in PTL 1, however, such a case where a user performs an operation for a device in a region incapable of being visually recognized is not taken into consideration.

Solution to Problem

According to the present disclosure, provided is an information processing device including a control unit that, on the basis of a position of a recognized operation object, dynamically controls output of an information associated with at least one operation region in which the recognized operation object is located, in which, in a case where the recognized operation object is located in the operation region, the control unit controls execution of a device function corresponding to the operation region in which the recognized operation object is located, and the operation region includes a region incapable of being visually recognized by a user.

Further, according to the present disclosure, provided is an information processing method including, on the basis of a position of a recognized operation object, allowing a processor to dynamically control output of an information associated with at least one operation region in which the recognized operation object is located, and in a case where the recognized operation object is located in the operation region, allowing the processor to control execution of a device function corresponding to the operation region in which the recognized operation object is located, in which the operation region includes a region incapable of being visually recognized by a user.

Further, according to the present disclosure, provided is a program for causing a computer to function as an information processing device including a control unit that, on the basis of a position of a recognized operation object, dynamically controls output of an information associated with at least one operation region in which the recognized operation object is located, the control unit being configured to, in a case where the recognized operation object is located in the operation region, control execution of a device function corresponding to the operation region in which the recognized operation object is located, and the operation region including a region incapable of being visually recognized by a user.

BRIEF DESCRIPTION OF DRAWINGS

FIG. 3 depicts diagrams that describe examples of notification-sound output control based on a gesture type, which is performed by the control unit 130 according to the embodiment.

FIG. 4 depicts diagrams that describe examples of notification-sound output control based on the number of fingers of a user, which is performed by the control unit 130 according to the embodiment.

FIG. 6 depicts diagrams that describe an example of notification-sound output control based on a movement direction of an operation object, which is performed by the control unit 130 according to the embodiment.

FIG. 8 depicts diagrams that describe examples of changes of a pitch and a density of a notification sound output from a single sound source, according to present embodiment.

FIG. 9 depicts diagrams that describe examples of notification-sound output control based on comparison of a movement distance of an operation object with a predetermined threshold value, which is performed by the control unit 130 according to the embodiment.

FIG. 11 depicts diagrams that describe examples of output control of a notification sound corresponding to an operation region in which an operation object is located, which is performed by the control unit 130 according to the embodiment.

FIG. 12 depicts diagrams that describe an example of notification-sound output control in a case where it is predicted that an operation object is to be moved to the outside of operation regions, which is performed by the control unit 130 according to the embodiment.

FIG. 16 depicts diagrams that describe an example of notification-sound output control associated with a reference region, which is performed by the control unit 130 according to the embodiment.

FIG. 17 depicts diagrams that describe an example of notification-sound output control associated with a reference region whose position is optionally determined, which is performed by the control unit 130 according to the embodiment.

FIG. 19 depicts diagrams that describe an example of a case where, a distance between an operation object and an information processing terminal 10 is indicated as a recognized status and execution control of a function associated with the information processing terminal 10 is performed on the basis of the distance by the control unit 130 according to the embodiment.

FIG. 24 is a block diagram illustrating a hardware configuration example of an information processing terminal 10 according to an embodiment of the present disclosure.

DESCRIPTION OF EMBODIMENT

Figure 1:
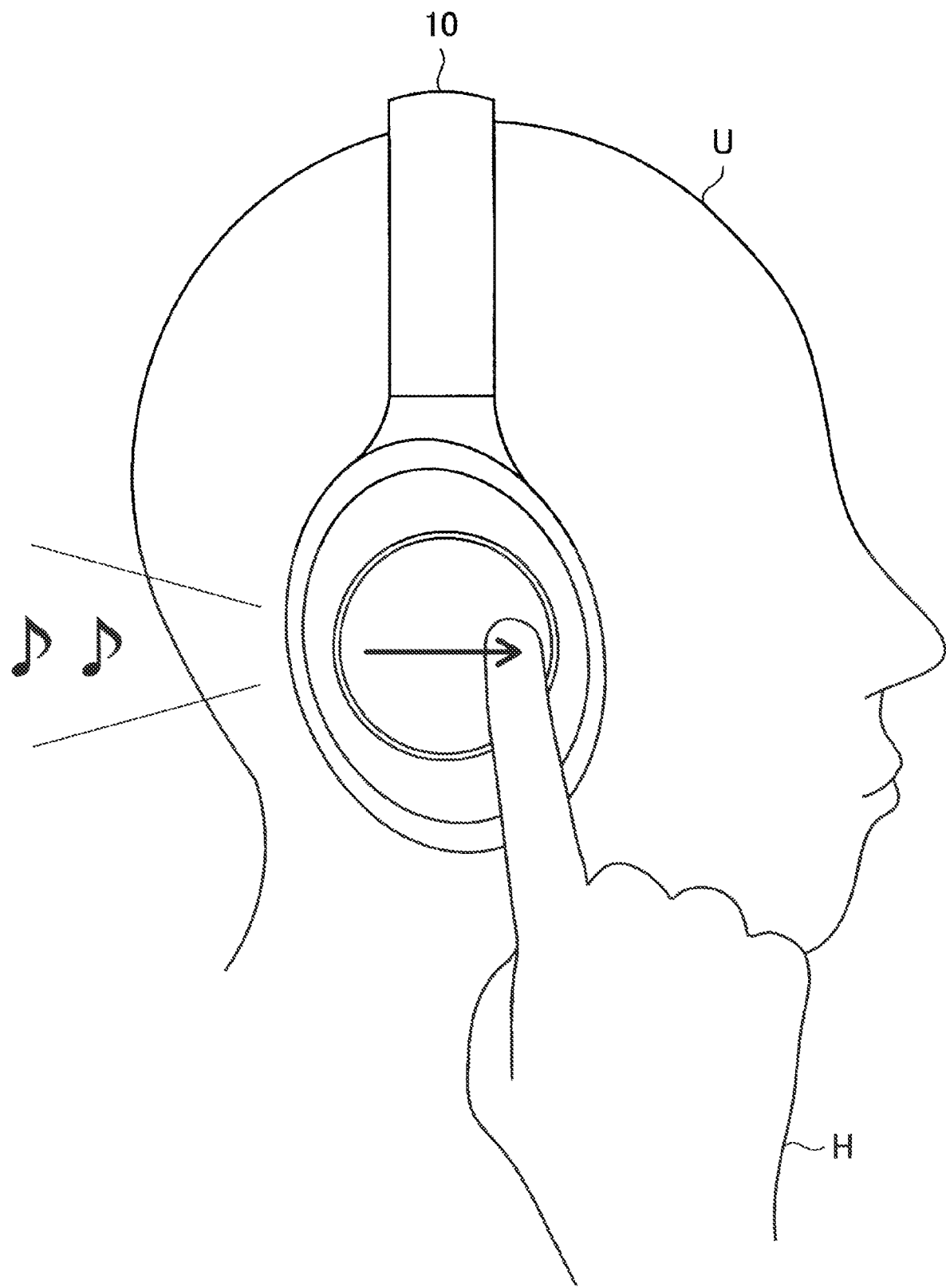
FIG. 1 is a diagram that describes an outline of an information processing terminal according to the present disclosure.

Hereinafter, a preferred embodiment of the present disclosure will be described in detail referring to the accompanying drawings. Note that, in the present description and the drawings, constituent elements having substantially the same functional configuration will be denoted by the same reference signs and thereby duplicated descriptions thereof will be omitted.

Note that the description will be made in the following order.

1. Outline
2. Embodiment
2. 1. Functional configuration example
2. 2. Specific examples
  2. 2. 1. Specific example 1
  2. 2. 2. Specific example 2
  2. 2. 3. Specific example 3
  2. 2. 4. Specific example 4
  2. 2. 5. Specific example 5
  2. 2. 6. Specific example 6
3. Operation examples
4. Hardware configuration example
5. Summary

1. OUTLINE

First, an outline of the present disclosure will be described below. In recent years, technology has been developed for causing an information processing terminal, such as a headphone, an earphone, or the like, which is worn on the ears of a user and outputs sounds to execute predetermined functions by allowing the user to directly operate the information processing terminal. Such technology makes it possible to execute music playback processing, music-playback stop processing, and the like on the basis of, for example, touch operations onto the information processing terminal, and enables achievement of further user-friendly operations that do not need any other device.

Further, for such an information processing terminal including a proximity sensor, technology has been also developed for, on the basis of a predetermined gesture having been executed by a hand of the user in a real space where detection by the proximity sensor is possible, causing a function corresponding to the gesture to be executed. This technology makes it possible to execute processing for sound volume control or the like on the basis of, for example, change in distance from a hand of the user to the terminal, in the real space, and thus, even for an earphone type device for which it is difficult for the user to perform direct touch operations, the above technology enables achievement of further user-friendly operations that do not need any other device.

However, for the operations for the terminal according to the above technologies, such situations as described below may arise.

First, operations for the headphone or the earphone that is worn by the user may be executed at portions, such as ones on a side face of the headphone (housing surface), which the user is unable to visually recognize. For this reason, the user is unable to confirm whether or not a gesture that the user is executing is being executed as intended by the user. As a result, in a case where a gesture type different from a gesture type intended by the user has been recognized by the terminal, a situation may arise in which, at a stage when a function different from a function desired by the user has been executed, the user notices that a different gesture type has been recognized.

Further, the user is unable to grasp at which of operation executable portions the hand of the user is located, in a region that the user is unable to visually recognize. For this reason, a situation may arise in which the user is unable to perform an intended operation. For example, when the user performs, in the headphone, a swipe operation in a predetermined direction on a housing surface having a touch panel, a situation may arise in which, in a case where the user starts the swipe operation from the edge of the housing surface, an operation up to a sufficient distance cannot be performed. Further, in the case where an operation is performed on the basis of a gesture in a space, the user U is not in contact with the terminal, and thus, it is more difficult for the user to grasp at which position the gesture is being executed in the space.

The technical thought of the present disclosure has been conceived of in view of the above points, and the present disclosure is intended to enable a user to, in a region that the user is unable to visually recognize, confirm success/failure of each of operations, and perform a wider variety of operations.

Here, an outline of an information processing terminal 10 according to the present disclosure will be described with reference to FIG. 1. FIG. 1 is a diagram that describes an outline of an information processing terminal according to the present disclosure. FIG. 1 illustrates the information processing terminal 10 serving as a headphone and worn by a user U.

In a case where the information processing terminal 10 has recognized a predetermined gesture operation by a hand H of the user U, which is an operation object, in an operation available region on a housing surface, the information processing terminal 10 executes a function corresponding to the recognized operation. Here, the information processing terminal 10 is capable of notifying of information regarding the function corresponding to the gesture operation, on the basis of a recognized status regarding the operation object that is executing the predetermined gesture operation. Here, in an example illustrated in FIG. 1, the notification of the information may be executed by means of output of sound.

Further, the information processing terminal 10 is also capable of recognizing at which position the hand H of the user U exists in an operation region, and outputting information corresponding to the operation region in which the hand H of the user U exists. Here, in the example illustrated in FIG. 1, the output of the information may be executed by means of the output of sound. Note that, in the present description, hereinafter, examples in which the information processing terminal 10 is a headphone or an earphone will be described.

2. EMBODIMENT

2.1 Functional Configuration Example

Figure 2:
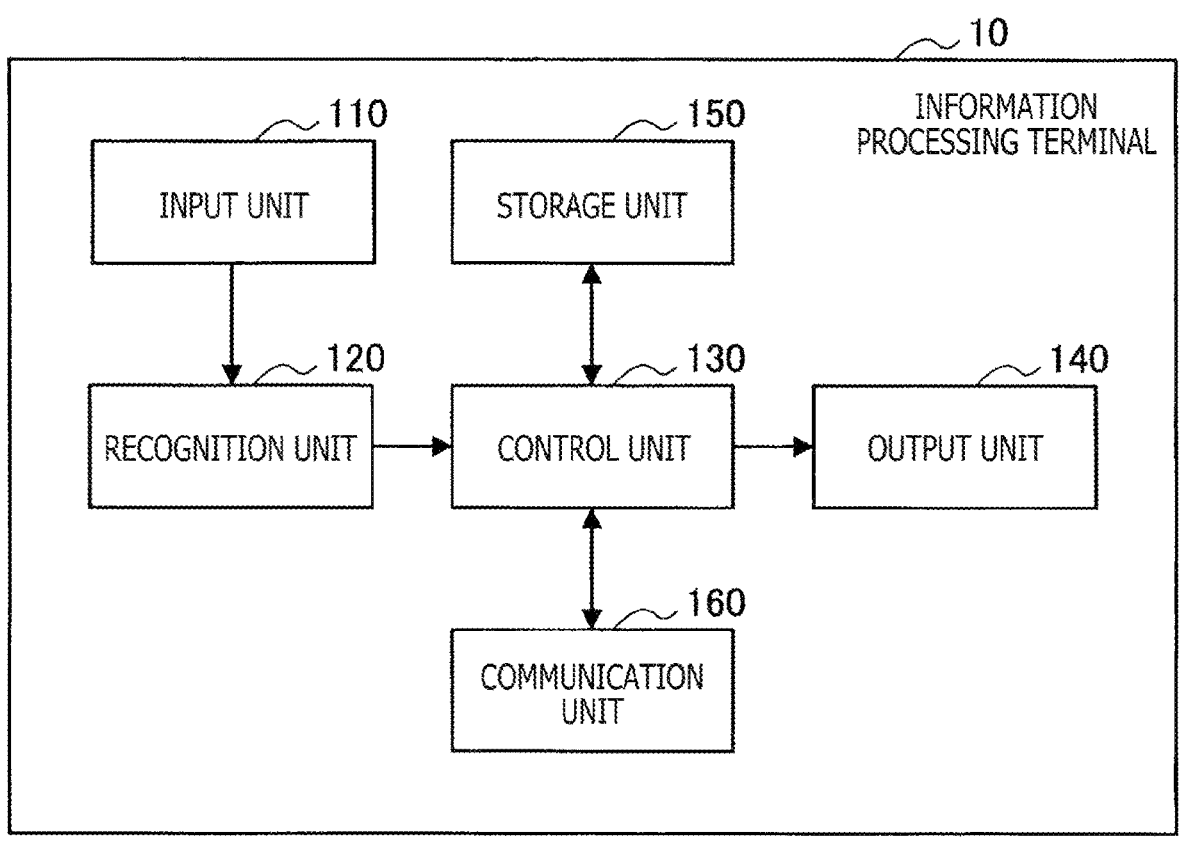
FIG. 2 is a diagram that describes a functional configuration example of an information processing terminal 10 according to an embodiment of the present disclosure.

Subsequently, a functional configuration example of the information processing terminal 10 according to the present embodiment will be described. FIG. 2 is a diagram that describes a functional configuration example of the information processing terminal 10 according to the present embodiment. The information processing terminal 10 includes an input unit 110, a recognition unit 120, a control unit 130, an output unit 140, a storage unit 150, and a communication unit 160.

(Input Unit 110)

The input unit 110 receives various kinds of information. The input unit 110, for example, receives operation inputs from a user. The input unit 110, for example, may include a touchpad on a housing surface to receive touch operations from the user. The input unit 110 may detect contacts of the operation object with the touchpad. Further, the input unit 110 may include a proximity sensor to detect the operation object being located in the real space. Hereinafter, a region used for an operation in a region in which the input unit 110 is capable of detecting the operation object will be also referred to as an operation region.

Here, the input unit 110 may include a microphone for capturing external sound. An external sound signal having been captured by the input unit 110 through the microphone may be used for external sound elimination processing. The information having been received by the input unit 110 is transmitted to the recognition unit 120.

(Recognition Unit 120)

The recognition unit 120 executes various kinds of recognition processing on the basis of the information having been transmitted from the input unit 110. The recognition unit 120 recognizes that a predetermined operation is being executed. Further, the recognition unit 120 has a gesture recognition function. The recognition unit 120 is capable of recognizing a slide on the touchpad, or the execution of a gesture in the real space where the detection by the proximity sensor is available, on the basis of the result of the detection by the touchpad or the proximity sensor. The result of the recognition by the recognition unit 120 is transmitted to the control unit 130 as a recognized status.

(Control Unit 130)

The control unit 130 performs control of individual constituent elements of the information processing terminal 10.

Further, on the basis of a recognized status regarding the operation object that is executing a gesture in an operation region, the control unit 130 may dynamically control the output of notification information regarding a function corresponding to the gesture. Here, as described above, the recognized status regarding the operation object is the result of recognition having been recognized by the recognition unit 120. The control unit 130 controls the output of the notification information according to various statuses included in the recognized status. Further, here, the notification information is information associated with a gesture being executed. The information associated with the gesture that is being executed is, for example, such information as enables the user U to understand a gesture type having been recognized by the recognition unit 120. Further, the notification information is, for example, a notification sound.

In the present description, hereinafter, examples in which the notification information is the notification sound will be described, but, as a matter of course, the notification information may be expressed by information other than sound information. Other examples of the notification information include vibration information and the like. A configuration in which the control unit 130 controls the output of the notification information on the basis of the recognized status enables the user U to confirm whether or not the gesture has been recognized as intended by the user U in a region that the user U is unable to visually recognize.

Further, the control unit 130 may control, on the basis of a position of the operation object, which is indicated by the recognized status, the output of notification information associated with an operation region in which the operation object is located. Here, examples of the notification information associated with the operation region include information indicating whether or not the operation object is located in the operation region, information indicating, in the case where a plurality of operation regions exists, at which of the operation regions the operation object is located, and the like. Note that, as described above, in the following description, hereinafter, examples in which the notification information associated with the operation region is a notification sound associated with the operation region will be described. The control unit 130 controls execution of a function corresponding to an operation region in which the operation object is located. Here, examples of the function include an output sound volume control function, a music forward function, a music go-back function, and the like. A configuration in which the control unit 130 controls output of information associated with an operation region in which the operation object is located enables the user U to confirm whether an operation is to be executed at a place intended by the user U.

For the notification-sound output control by the control unit 130, specific examples will be described later.

(Output Unit 140)

The output unit 140 outputs various kinds of information according to control by the control unit 130. The output unit 140, for example, causes a driver unit to output sound. Examples of the sound output by the output unit 140 include the above-described notification sound. Further, the output unit 140 executes a predetermined function according to the control by the control unit 130. Further, the output unit 140 may include an actuator to output the notification information by means of a vibration.

(Storage Unit 150)

The storage unit 150 stores various kinds of information regarding the operation of the information processing terminal 10. The storage unit 150 may store, for example, sound source information to be used as the notification sound.

(Communication Unit 160)

The communication unit 160 performs information communication with another device. For example, the communication unit 160 receives sound information from the other device. The sound information having been received by communication unit 160 is, for example, output to the user U by the output unit 140 via the control unit 130. Further, examples of the other device include a music player, a smartphone, and the like.

2.2 Specific Examples

Subsequently, specific examples of notification-sound output control performed by the information processing terminal 10 according to the present embodiment will be described.

2.2.1. Specific Example 1

First, the control unit 130 may dynamically control output of a notification sound on the basis of a gesture type of a gesture that is being executed by the operation object and that is indicated by the recognized status. Here, the gesture type means a type that is determined on the basis of, for example, how the operation object has been moved in an operation region. In the case of the headphone equipped with the touchpad, examples of the gesture type include an operation object's horizontal-direction sliding movement on the touchpad, an operation object's circle-drawing movement, like moving while drawing a circle, on the touchpad, and the like. Notifying the user U of a gesture type being recognized by the recognition unit 120 as a notification sound enables the user U to confirm whether or not a gesture currently being executed is recognized by the information processing terminal 10, as a gesture intended by the user U. Further, in a case where there exist functions associated with the information processing terminal 10 and executed as functions corresponding to gesture types, the user U is also able to confirm whether or not a gesture corresponding to a function intended by the user U is recognized.

In the description below, examples of notification-sound output control based on a gesture type, which is performed by the control unit 130 according to the present embodiment, will be described with reference to FIG. 3. FIG. 3 depicts diagrams that describe examples of notification-sound output control based on a gesture type, which is performed by the control unit 130 according to the present embodiment. FIG. 3 illustrates the information processing terminal 10 serving as the headphone and worn by the user U.

In the left-hand area of FIG. 3, the hand H of the user U, which is the operation object, is moving on the touchpad (flick movement) in a horizontal direction. It is indicated by the recognized status that the hand H of the user U is moving in the horizontal direction, and thus, the control unit 130 is causing the output unit 140 to output a notification sound corresponding to the horizontal-direction movement.

In the right-hand area of FIG. 3, the hand H of the user U is moving, like rotating on the touchpad. It is indicated by the recognized status that the hand H of the user U is moving while drawing a circle, and thus, the control unit 130 is causing the output unit 140 to output a notification sound corresponding to the horizon-direction movement. Here, the notification sound output from the output unit 140 is different from the notification sound that is output in the case of the left-hand area of FIG. 3.

In the example illustrated in FIG. 3, cases where the notification sound is output on the basis of the type of a gesture being executed have been described, and in addition thereto, the control unit 130 may control the output of a notification sound on the basis of the number of fingers of the hand H of the user U, which are executing a gesture. This configuration makes it possible to, even when the user U is executing a similar gesture, cause a notification sound corresponding to each of the number of fingers to be output, thereby enabling the user U to confirm whether or not a gesture corresponding to the number of fingers that is intended by the user U is recognized.

In addition to the above, the control unit 130 may output the notification sound further on the basis of a movement speed of the operation object that is executing a gesture. This configuration makes it possible to confirm the degree of the change of a setting value, and execute further detailed operations. Further, in a case where the control unit 130 is incapable of identifying the type of a gesture being executed, the control unit 130 may cause a notification sound corresponding to a preliminary operation of the gesture to be output until the identification of the type becomes possible, and at a stage when the identification of the type has been successfully made, the control unit 130 may cause a notification sound to be output on the basis of the type of the gesture being executed.

In the description below, an example of notification-sound output control based on the number of fingers of a user, which is performed by the control unit 130 according to the present embodiment, will be described with reference to FIG. 4. FIG. 4 depicts diagrams that describe examples of notification-sound output control based on the number of fingers of a user, which is performed by the control unit 130 according to the present embodiment. FIG. 4 illustrates the information processing terminal 10 serving as the headphone worn by the user U.

In the left-hand area of FIG. 4, one finger of the hand H of the user U is moving on the touchpad (flick movement) in a horizontal direction. Here, it is indicated by the recognized status that a gesture using two fingers is being executed, and thus, the control unit 130 is causing the output unit 140 to output a notification sound corresponding to such a horizontal-direction movement.

In the right-hand area of FIG. 4, two fingers of the hand H of the user U are moving on the touchpad in a horizontal direction. Here, it is indicated by the recognized status that a gesture using two fingers is being executed, and thus, the control unit 130 is causing the output unit 140 to output a notification sound corresponding to such a horizontal-direction movement. Here, the notification sound output from the output unit 140 is different from the notification sound that is output in the case of the left-hand area of FIG. 4.

In this way, the output notification sound is changed on the basis of the type of a gesture being executed and the number of fingers that are executing a gesture. Note that the control unit 130 may output the notification sound only in a case where the recognized status indicates that the number of fingers of the user U that serve as the operation object is a predetermined number. For example, in the case of the examples illustrated in FIG. 4, the control unit 130 may output a notification sound only in a case where it is indicated by the recognized status that the gesture using two fingers is being executed, that is, while, for example, two fingers are continuously in contact with the touchpad. This configuration enables the user U to further clearly grasp the recognized number of fingers.

Here, when the operation object moves across an operation region, the control unit 130 may dynamically control the output of a notification sound on the basis of a movement direction of the operation object, which is indicated by the recognized status. Specifically, the control unit 130 may change the output feature of a notification sound on the basis of the movement direction of the operation object, which is indicated by the recognized status. The output feature of a notification sound here corresponds to, for example, the frequency, pitch, density, sound volume, and the like of the notification sound. A configuration in which the notification sound is output on the basis of the movement direction of the operation object enables the user U to confirm whether or not the operation object is being moved as intended by the user U.

Figure 5:
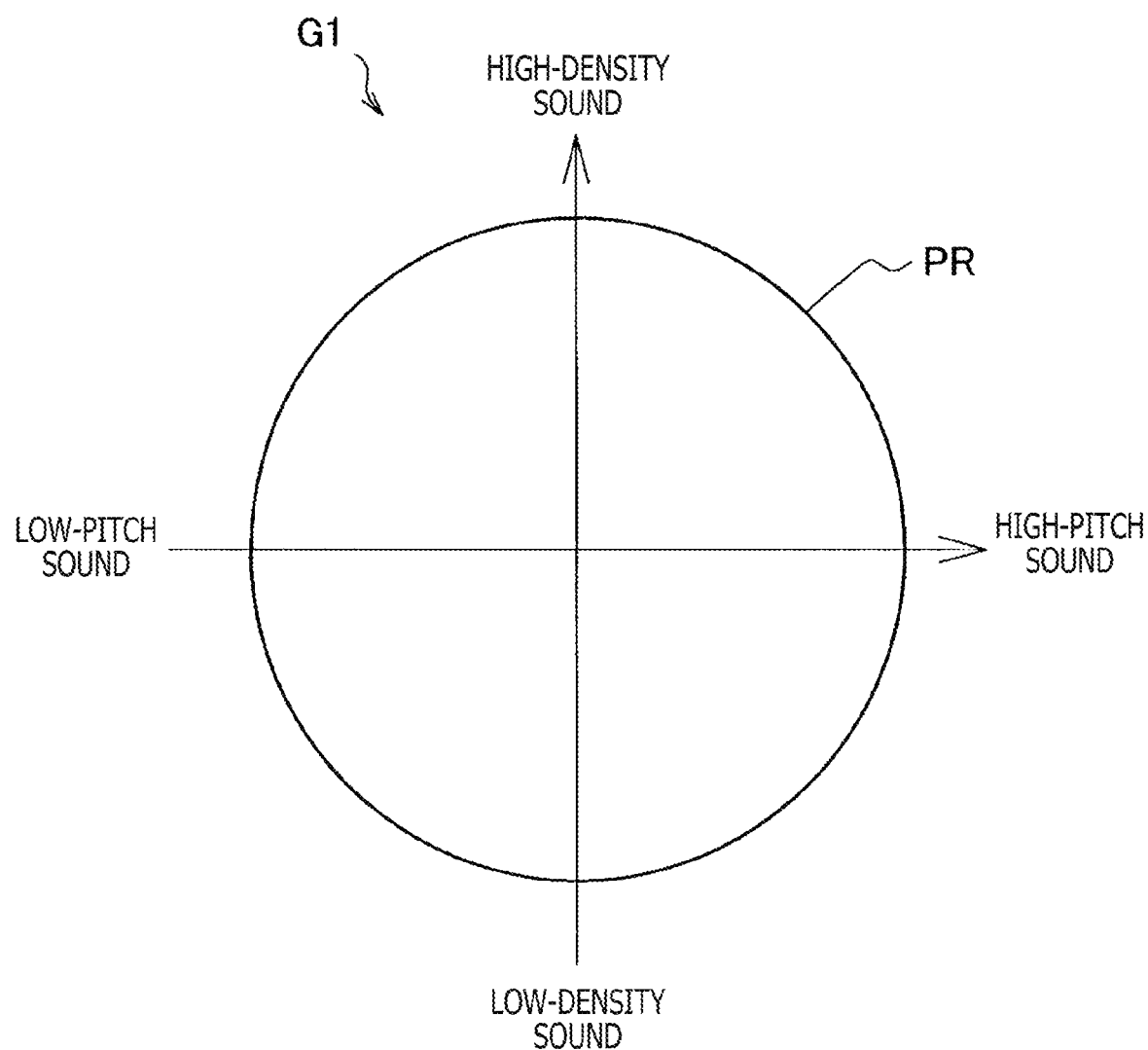
FIG. 5 is a diagram that describes an example of notification-sound output control based on a movement direction of an operation object, which is performed by the control unit 130 according to the embodiment.
Figure 7:
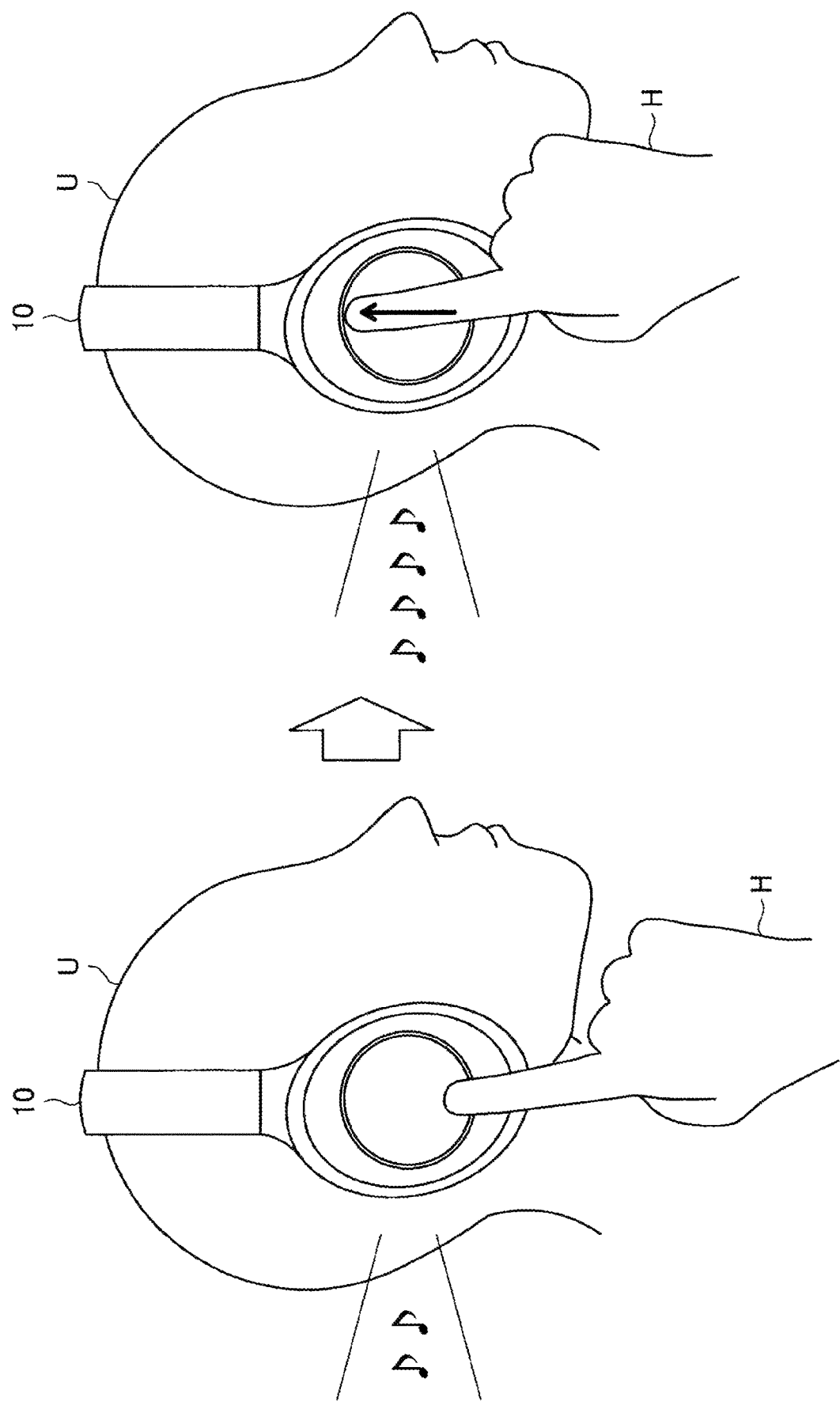
FIG. 7 depicts diagrams that describe an example of notification-sound output control based on a movement direction of an operation object, which is performed by the control unit 130 according to the embodiment.

Here, examples of notification-sound output control based on the movement direction of the operation object, which is performed by the control unit 130 according to the present embodiment, will be described with reference to FIGS. 5 to 7. FIGS. 5 to 7 are diagrams that describe examples of notification-sound output control based on a movement direction of the operation object, which is performed by the control unit 130 according to the present embodiment.

FIG. 5 illustrates a graph G1 representing the change of a notification sound based on the movement direction of the operation object. As illustrated in the graph G1, for example, the pitch of the notification sound may be gradually increased as the operation object is moved rightward, whereas the pitch of the notification sound may be gradually decreased as the operation object is moved leftward. Further, as illustrated in the graph G1, for example, the density of the sound to be output as the notification sound may be gradually increased as the operation object is moved upward, whereas the density of the sound to be output as the notification sound may be gradually decreased as the operation object is moved downward. In addition, in a case where the operation region is denoted by a region PR, the pitch and the density of the notification sound may be determined on the basis of the position of the operation object in the region PR. The control unit 130 may output the notification sound in a way following the movement of the operation object.

FIGS. 6 and 7 illustrate the information processing terminal 10 serving as the headphone and worn by the user U. Here, as illustrated in FIG. 6, in a case where the recognition unit 120 has recognized that the operation object is moving from the left side to the right side (i.e., from the rear side to the front side) of the touchpad, the control unit 130 gradually increases the pitch of the notification sound. Further, as illustrated in FIG. 7, in a case where the recognition unit 120 has recognized that the operation object is moving from the bottom side to the top side of the touchpad, the control unit 130 gradually increases the density of the notification sound.

Meanwhile, the frequency and the sound volume of the notification sound may be determined on the basis of the movement direction of the operation object. Particularly, in a case where the notification sound includes a single sound source, the pitch and the density of the notification sound may be determined on the basis of the movement direction of the operation object. Outputting such a notification sound including the single sound source enables the user U to further easily grasp the change of the notification sound. For example, changing the repetition number of single sound-source outputs at a time of an operation of changing a predetermined setting value enables the user U to further specifically grasp how the setting value is being changed.

Here, examples of the changes of the pitch and the density of a notification sound output from a single sound source, according to the present embodiment, will be described with reference to FIG. 8. FIG. 8 depicts diagrams that describe examples of the changes of the pitch and the density of the notification sound output from the single sound source, according to the present embodiment. FIG. 8 illustrates graphs G2 to G4. The graph G2 illustrates a state in which the single sound source is repeated. Further, the graph G3 illustrates a state in which the single sound source is repeated in such a way that the density of the repeated single sound sources is high, as compared with the graph G2. Further, the graph G3 illustrates a state in which the pitch of the single sound source is decreased, as compared with the graphs G2 and G3.

2.2.2. Specific Example 2

Meanwhile, there exists a device configured to allow a function to be executed in a case where an operation object has been moved at a predetermined distance, and as an example of such a device, there exists a smartphone, which is configured to, on a lock screen, allow a swipe operation at a predetermined distance on a touch panel to release the lock. Similarly, also in the information processing terminal 10 according to the present embodiment, the control unit 130 may dynamically control the output of the notification sound on the basis of the comparison of a movement distance of the operation object with a predetermined threshold value. Specifically, the control unit 130 may dynamically control the output of the notification sound on the basis of the difference between the movement distance of the operation object and the predetermined threshold value. Here, the movement distance of the operation object is a movement distance of the operation object in the operation region, and the predetermined threshold value may be a preliminarily determined value.

Here, examples of notification-sound output control based on the comparison of a movement distance of the operation object with a predetermined threshold value, which is performed by the control unit 130 according to the present embodiment, will be described with reference to FIG. 9. FIG. 9 depicts diagrams that describe examples of notification-sound output control based on the comparison of a movement distance of the operation object with a predetermined threshold value, which is performed by the control unit 130 according to the present embodiment. FIG. 9 illustrates a graph G5 indicating that the operation object has been moved at equal to or greater than a predetermined distance, and a graph G6 indicating the pitch of the notification sound, which corresponds to the movement distance illustrated in the graph G5. Further, FIG. 9 illustrates a graph G7 indicating that the movement of the operation object has been stopped before the operation object is moved at equal to or greater than the predetermined distance, and a graph G8 indicating the pitch of the notification sound, which corresponds to the movement distance illustrated in the graph G7.

In each of the graphs G5 and G7, the horizontal axis corresponds to time, and the vertical axis corresponds to a position relative to a reference that is an initial position of the operation object. Further, in each of the graphs G6 and G8, the horizontal axis corresponds to time, and the vertical axis corresponds to a pitch of the notification sound. As illustrated in the graphs G5 and G7, the pitch of the notification sound is gradually increased as the operation object is moved, and even after the movement distance has exceed the predetermined threshold value, similarly, the pitch of the notification sound may be increased. Note that, in a case where the movement distance of the operation object has exceeded the predetermined threshold value, a function associated with the information processing terminal 10 may be executed.

On the other hand, as illustrated in the graphs G6 and G8, although the pitch of the notification sound is gradually increased as the operation object is moved, the operation is ended before the movement distance exceeds the predetermined threshold value. In such a case, as illustrated in the graph G8, the change of the pitch of the notification sound may be switched from an upward change to a downward change. Here, the pitch of the notification sound may become approximately the same pitch of the notification sound as that at a moment when the operation by the operation object has been started. Note that, since the movement distance of the operation object does not exceed the predetermined threshold value, the control unit 130 does not execute the similar function above.

By comparing the graph G6 with the graph G8, it can be found that the manner of the change of the pitch of the notification sound differs according to whether or not the movement distance of the operation object has exceeded the predetermined threshold value. This difference, therefore, enables the user U to intuitively grasp whether or not a corresponding function has been successfully executed. Note that the notification-sound output control having been described in FIG. 9 is just an example, and the present disclosure is not limited to this example.

2.2.3. Specific Example 3

Further, the control unit 130 may control, on the basis of the position of the operation object, which is indicated by the recognized status, a sound output associated with an operation region in which the operation object position is located. That is, the control unit 130 may make feedback regarding the position of the operation object to the user U on the basis of the position of the operation object, which is indicated by the recognized status. For example, in a case where a plurality of operation regions exists, the control unit 130 may control a sound output on the basis of which operation region the operation object is located at.

Figure 10:
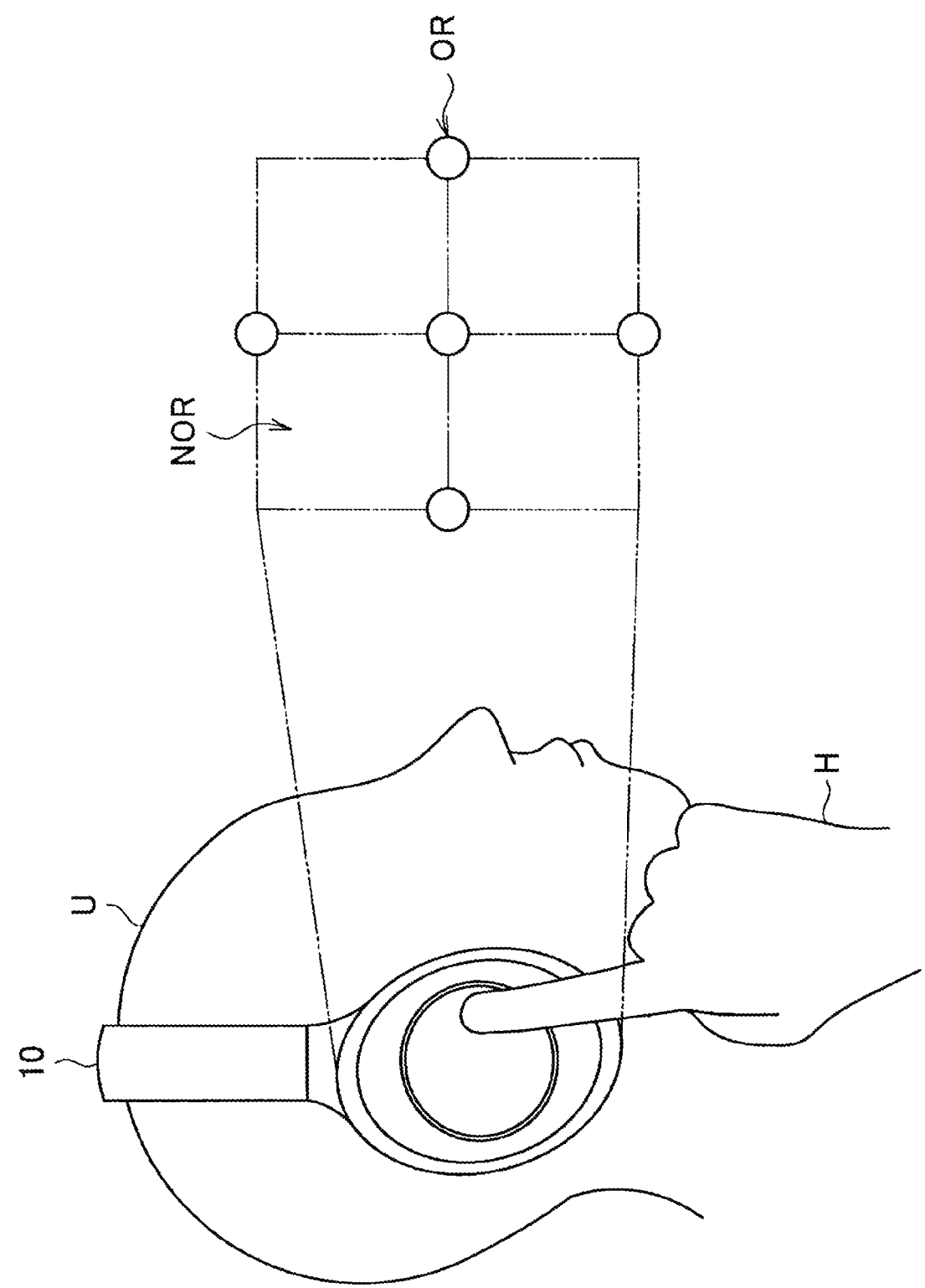
FIG. 10 is a diagram that describes an example of operations regions according to the embodiment.

Here, an example of operation regions according to the present embodiment will be described with reference to FIG. 10. FIG. 10 is a diagram that describes an example of operation regions according to the present embodiment. FIG. 10 illustrates the information processing terminal 10 serving as the headphone and worn by the user U, and two kinds of operation regions, that is, an operation available region OR and an operation unavailable region NOR, which are disposed on the touchpad of the information processing terminal 10. Here, the operation available region OR is a circular-shaped region that is available to operations by the operation object and that the user U is unable to visually recognize. In FIG. 10, a plurality of the operation available regions OR exists, and in a case where an operation by the operation object is executed in any operation available region OR among the operation available regions OR, the control unit 130 may control execution of a function associated with the information processing terminal 10 and corresponding to the operation available region OR. On the other hand, the operation unavailable region NOR is a region unavailable to any operation by the operation object. as a matter of course, the arrangements and the shapes of each of the operation available regions OR and each of the operation unavailable regions NOR are not limited to such illustrated example.

As described above, a plurality of independent operation regions may exist. In such a case, the control unit 130 may control the output of a sound corresponding to an operation region in which the operation object is located. The sound output here may be, for example, the above-described notification sound. Here, examples of output control of a notification sound corresponding to an operation region in which the operation object is located, which is performed by the control unit 130 according to the present embodiment, will be described with reference to FIG. 11. FIG. 11 depicts diagrams that describe examples of output control of a notification sound corresponding to an operation region in which the operation object is located, which is performed by the control unit 130 according to the present embodiment. FIG. 11 illustrates the information processing terminal 10 serving as the headphone and worn by the user U, and operation regions R1 to R4. Note that the operation regions R1 to R4 are regions similar to the operation available regions OR illustrated in FIG. 10.

In the left-hand area of FIG. 11, the hand H of the user U, which is the operation object, is located at the operation region R1. The recognized status indicates that the hand H of the user U is located at the operation region R1, and the control unit 130 is causing the output unit 140 to output a notification sound corresponding to the operation region R1. In the right-hand area of FIG. 11, the hand H of the user U, which is the operation object, is located at the operation region R2. The recognized status indicates that the hand H of the user U is located at the operation region R2, and the control unit 130 is causing the output unit 140 to output a notification sound corresponding to the operation region R2. Here, the notification sound output from the output unit 140 is different from the notification sound that is output in the case of the left-hand side of FIG. 11. In this way, in a case where the plurality of operation regions exists, the user U is able to, without making a visual confirmation, grasp at which of the operation regions the operation object is located.

Meanwhile, the user U is unable to visually recognize the operation regions, and thus, there is a possibility that the operation object is unintentionally moved away to the outside of the operation regions. Thus, in a case where it is predicted, according to the recognized status, that the operation object is to be moved away to the outside of the operation regions, the control unit 130 may cause a notification sound to be output for notifying of the predicted movement to the outside of the operation regions.

Here, an example of notification-sound output control in the case where it is predicted that the operation object is to be moved away to the outside of operation regions, which is performed by the control unit 130 according to the present embodiment, will be described with reference to FIG. 12. FIG. 12 depicts diagrams that describe an example of notification sound output control in the case where it is predicted that the operation object is to be moved away to the outside of operation regions, which is performed by the control unit 130 according to the present embodiment. FIG. 12 illustrates the information processing terminal 10 serving as the headphone and worn by the user U, and the operation regions R1 to R4.

In the left-hand area of FIG. 12, like in the left-hand area of FIG. 11, the hand H of the user U, which is the operation object, is located at the operation region R1. Here, the control unit 130 is causing the output unit 140 to output a notification sound corresponding to the operation region R1. In the right-hand area of FIG. 12, the hand H of the user U, which is the operation object, is located at the operation region R2 and is in a state of being moved from the operation region R2 to the outside. In such a state, the control unit 130 causes a notification sound for notifying that it is predicted that the operation object is to be moved from the operation region R2 to the outside to be output. The notification sound that is output in the case of the right-hand area of FIG. 12 may be a sound for notifying a warning regarding a predicted movement of the operation object to the outside of the operation regions. In this way, even in the case where the operation object is about to be moved to the outside of the operation regions, the user U is able to correct the position of the operation object. Note that in the case where, regardless of the movement direction of the operation object, the operation object is located at a position inside and adjacent to an external edge of an operation region, this situation may be deemed to be a situation in which it is predicted that the operation object is to be moved to the outside of the operation region.

2.2.4. Specific Example 4

Heretofore, the examples of notification-sound output control in the case where the notification-sound output control is associated with only one operation region have been described. However, the control unit 130 may perform notification-sound output control associated with a plurality of operation regions. Specifically, the control unit 130 may cause notification sounds corresponding to the individual operation regions to be output on the basis of position relations between the operation object and the individual operation regions. For example, the control unit 130 may determine the sound volume, pitch, frequency, and the like of each of notification sounds that are to be output and that correspond to the individual operation regions, on the basis of the position relations between the operation object and the operation regions. The sound volume, pitch, frequency, and the like of each of the notification sounds may be determined on the basis of, for example, distances to the individual operation regions. Moreover, the control unit 130 may control the outputs of the notification sounds in such a way as to guide to a predetermined operation region.

Figure 13:
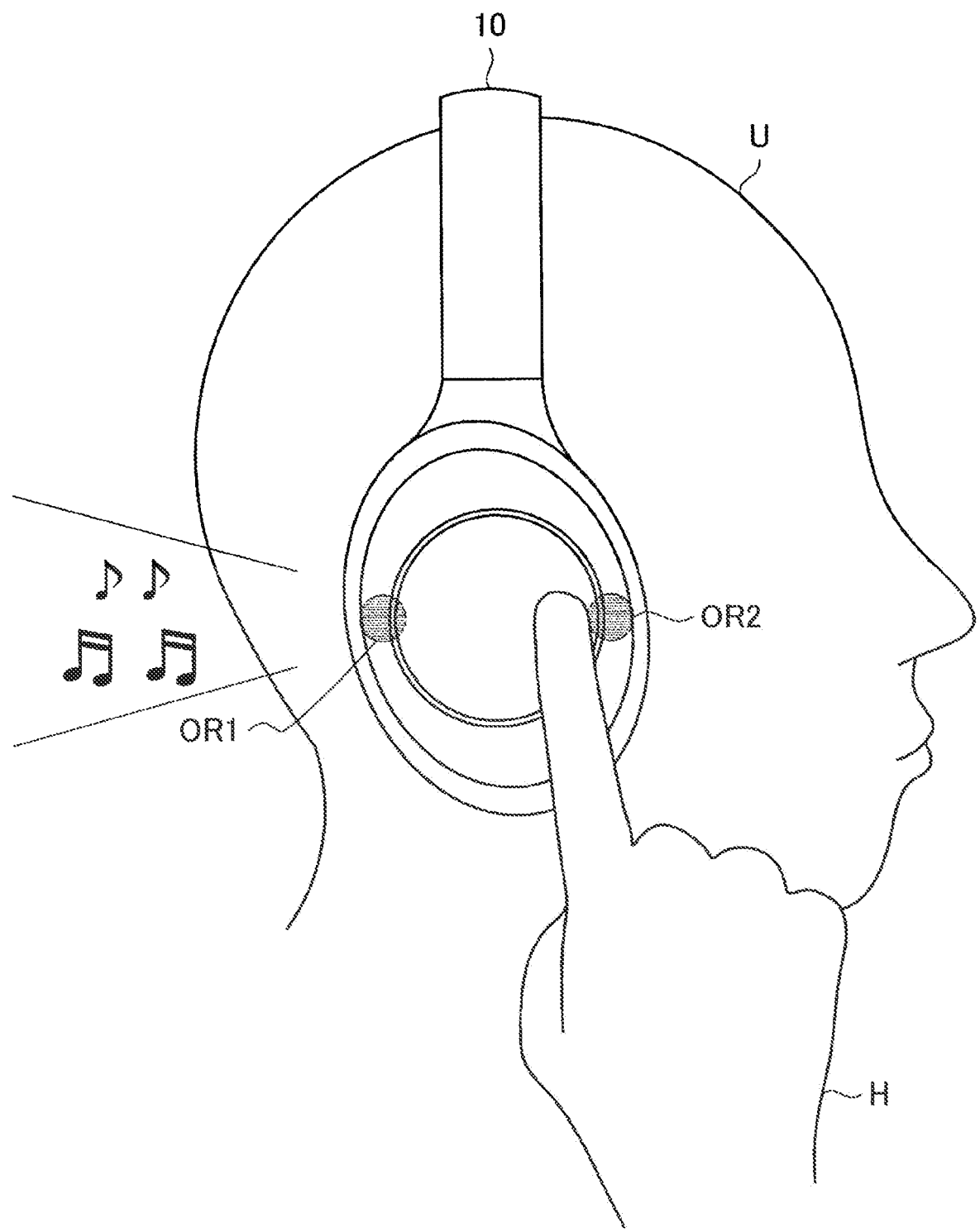
FIG. 13 is a diagram that describes an example of output control of notification sounds corresponding to individual operation regions, which is performed by the control unit 130 according to the embodiment.

Here, an example of output control of notification sounds corresponding to individual operation regions, which is performed by the control unit 130 according to the present embodiment, will be described with reference to FIG. 13. FIG. 13 is a diagram that describes an example of output control of notification sounds corresponding to individual operation regions, which is performed by the control unit 130 according to the present embodiment. FIG. 13 illustrates the information processing terminal 10 serving as the headphone and worn by the user U, and operation available regions OR1 and OR2.

The control unit 130 causes notification sounds corresponding to the individual operation available regions OR1 and OR2 to be output such that the shorter the distances from the operation object to the individual operation available regions OR1 and OR2 are, the larger the sound volumes of the notification sounds corresponding to the individual operation regions OR1 and OR2 are. In the example of FIG. 13, the position at which the hand H of the user U is being in contact with the touchpad is a position closer to the operation available region OR2 than to the operation region OR1. Thus, the control unit 130 is causing a notification sound corresponding to the operation available region OR2 to be output with a sound volume larger than that of a notification sound corresponding to the operation available region OR1.

This configuration that causes notification sounds associated with a plurality of operation regions to be output on the basis of the position relations between the operation object and the individual operation regions enables the user U to grasp the relative position relations between the operation object and the plurality of operation regions.

Note that, in a case where operation regions include the real space and the input unit 110 detects the operation object by using the proximity sensor, the control unit 130 may cause notification sounds corresponding to such operation regions to be output on the basis of distances in the real space between the operation object and the operation regions.

Figure 14:
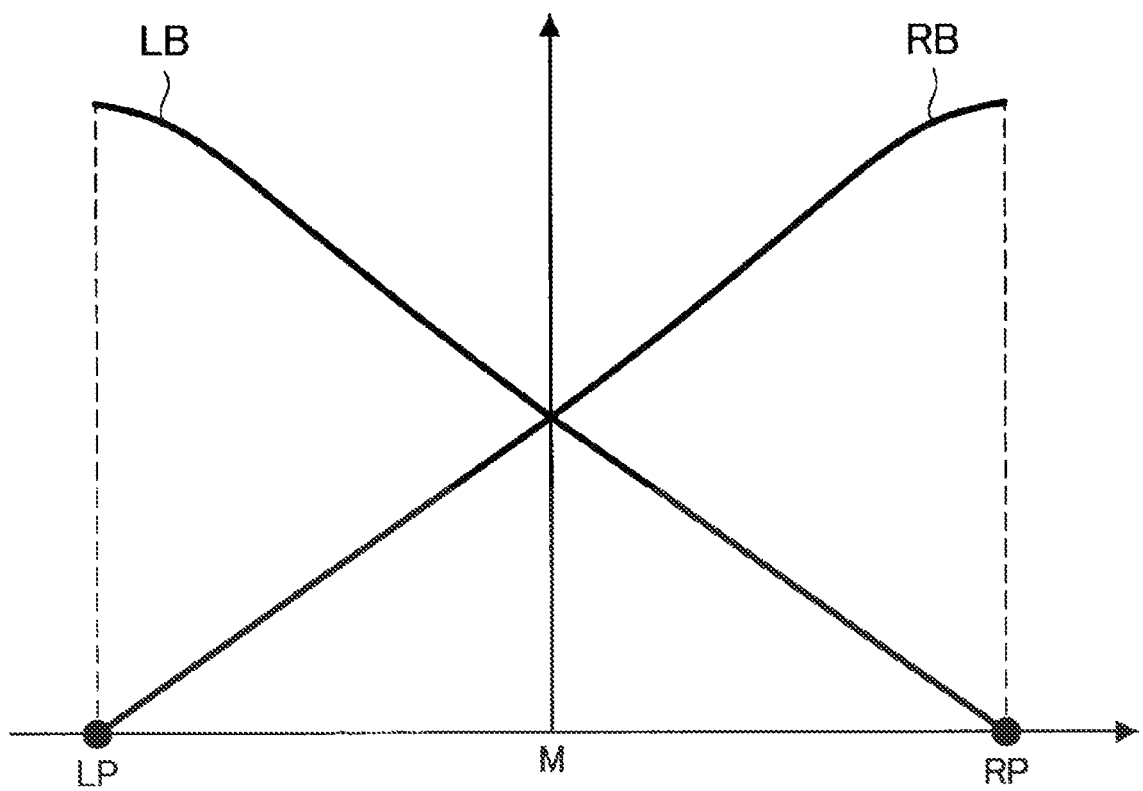
FIG. 14 is a diagram that describes an example of output sound volume control of notification sounds corresponding to individual operation regions, which is performed by the control unit 130 according to the embodiment.

Here, an example of output sound volume control of notification sounds corresponding to individual operation regions, which is performed by the control unit 130 according to the present embodiment, will be described with reference to FIG. 14. FIG. 14 is a diagram that describes an example of output sound volume control of notification sounds corresponding to individual operation regions, which is performed by the control unit 130 according to the present embodiment. FIG. 14 has the horizontal axis corresponding to a position and the vertical axis corresponding to a sound volume, and illustrates a graph BG including boundary points LP and RP each being a boundary between an operation region and another region. The boundary points LP and RP are boundary points located at boundaries with operation regions that are different from each other, and the area between the boundary points LP and RP is not included in the operation regions. Further, an intermediate point M is located at a middle point, and distances from this middle point to the boundary points LP and RP are equal to each other.

The graph BG indicates, in a case where the operation object is located between the boundary points LP and RP, a sound volume LB of a notification sound corresponding to the boundary point LP and a sound volume RB of a notification sound corresponding to the boundary point RP. As indicated in the graph BG, the control unit 130 causes the notification sounds to be output such that the closer to each of the boundary points the position of the operation object is, the larger the sound volume of a corresponding one of the notification sounds is. Note that the sum of the sound volume LB of the notification sound corresponding to the boundary point LP and the sound volume RB of the notification sound corresponding to the boundary point RP is made constant in order to make it easy for the user U to recognize the changes of the sound volumes of the individual notification sounds. In a case where the operation object is located at the intermediate point M, the sound volume of each of the notification sounds is half a maximum value.

This configuration that causes the sound volumes of a plurality of notification sounds, which correspond to the distances between the operation object and a plurality of operation regions, to be changed at the same time enables the user U to intuitively recognize the position of the operation object.

Meanwhile, the control unit 130 may cause information notified of by a notification sound to be varied on the basis of the position relation between the operation object and an aggregate of the plurality of operation regions. For example, in the case where the operation object is located in an area between any ones of the plurality of operation regions, the control unit 130 may output such notification sounds as those illustrated in FIG. 14. On the other hand, for example, in the case where the operation object is located in an area outside an area in which the plurality of operation regions exists, the control unit 130 may output a notification sound for notifying that the operation object is located in the area outside the area in which the plurality of operation regions exists because it is prioritized to cause the hand H of the user U to move into the area in which the plurality of operation regions exists.

Figure 15:
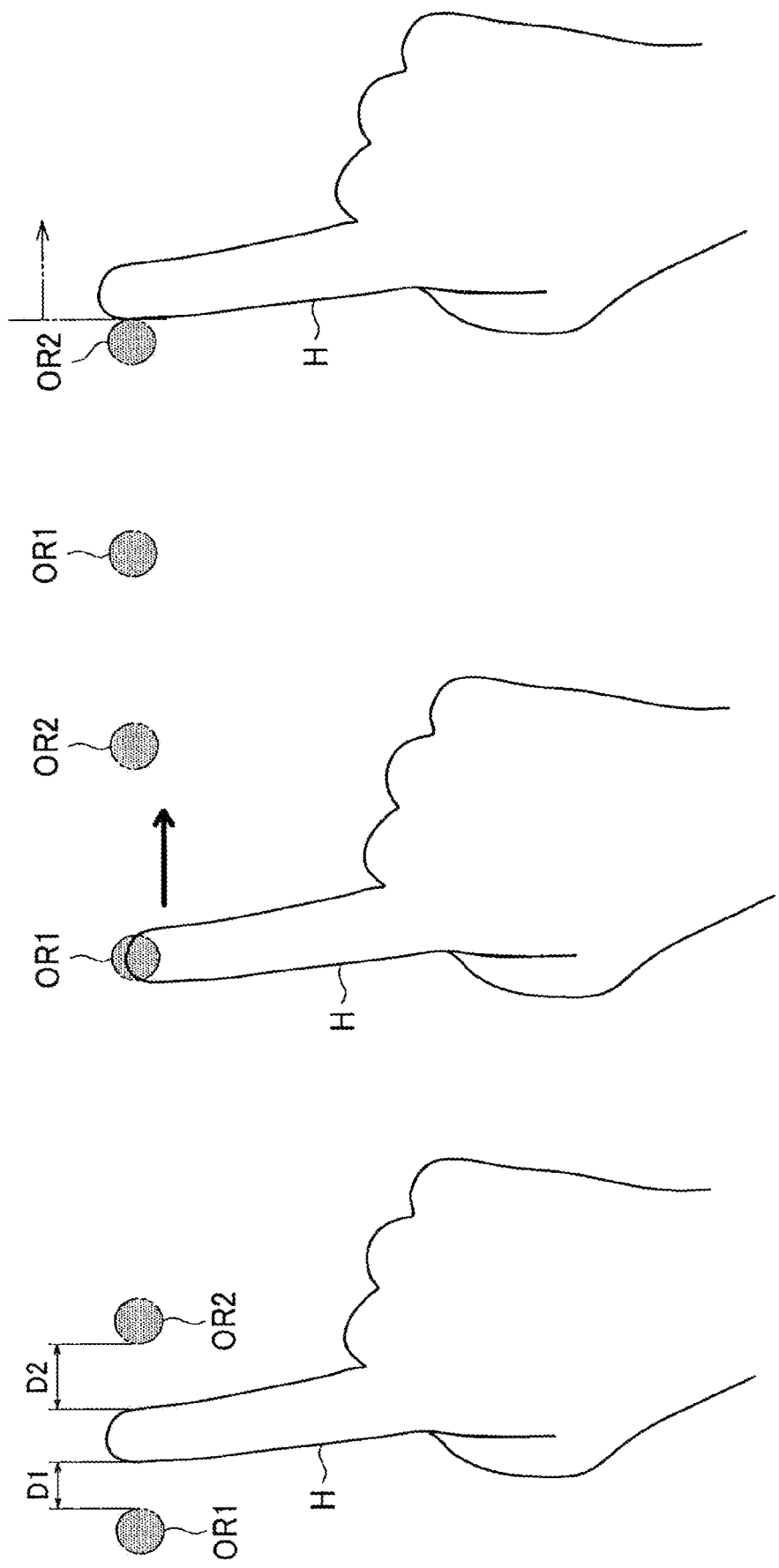
FIG. 15 depicts diagrams that describe position relations between an operation object and a plurality of operation regions and output control based on the position relations, according to the embodiment.

Here, position relations between the operation object and the plurality of operation regions as well as output control associated with the position relations, according to the present embodiment, will be described with reference to FIG. 15. FIG. 15 depicts diagrams that describe an example of position relations between the operation object and the plurality of operation regions, according to the present embodiment. FIG. 15 illustrates the hand H of the user U and operation available regions OR1 and OR2.

In the left-hand area of FIG. 15, the hand H of the user U is located between the operation available regions OR1 and OR2, and thus, the control unit 130 causes notification sounds corresponding to the individual operation regions to be output on the basis of the position relations between the operation object and the individual operation regions. In the middle area of FIG. 5, the hand H of the user U is located in the operation available region OR1, and thus, the control unit 130 causes only a notification sound corresponding to the operation available region OR1 to be output. In the right-hand area of FIG. 15, the hand H of the user U is located outside the operation executable areas OR1 and OR2, and thus, the control unit 130 causes a notification sound that notifies that the operation object is located outside the operation available regions OR1 and OR2, this notification sound being different from the notification sound that is output at a time when the operation object is located at the position illustrated in the left-hand area of FIG. 15.

This configuration that causes an output notification sound to be varied on the basis of position relations between the operation object and the plurality of operation regions enables the user U to further comfortably perform operations for the terminal.

Note that the control unit 130 may notify the user U by means of a sound, only in the case where the operation object is located outside the operation available regions OR1 and OR2. This configuration makes it possible to issue a warning against the user U with further certainty in a case where the operation object has been largely out of the plurality of operation regions, and in any other similar case. Also in a case where the information processing terminal 10 is an HMD (Head Mounted Display), the above notification can be applied thereto as a further certain warning.

2.2.5. Specific Example 5

Meanwhile, a configuration that enables the user U to, when performing an operation by use of the operation object in a region that the user U is unable to visually recognize, grasp a region (or a point) that becomes a reference may enhance the operability. For example, when the user U has become unable to grasp the position of the hand H of the user U, the user is able to grasp the position of the hand H again by returning the position of the hand H to a region serving as a reference. Thus, in a case where it has been recognized that the operation object is located at a reference region that serves as a reference for operations by the operation object, the control unit 130 may control the output of a notification sound corresponding to the reference region.

Here, an example of notification-sound output control associated with a reference region, which is performed by the control unit 130 according to the present embodiment, will be described with reference to FIG. 16. FIG. 16 depicts diagrams that describe an example of notification-sound output control associated with a reference region, which is performed by the control unit 130 according to the present embodiment. FIG. 16 illustrates the information processing terminal 10 serving as the headphone and worn by the user U, and a reference region SR. In FIG. 16, the reference region SR is a region that has been determined in advance and that is suitable as an operation start region.

In the left-hand area of FIG. 16, the hand H of the user U, which is the operation object, is moving on the touchpad (flick movement) in the horizontal direction. The hand H of the user U is located outside the reference region SR. Here, since the hand H of the user U is not located at the reference region, the control unit 130 does not cause any notification sound to be output.

On the other hand, in the right-hand area of FIG. 16, the hand H of the user U is located at the reference region SR. It is indicated by the recognized status that the hand H of the user U is located at the reference region SR, and the control unit 130 causes a notification sound corresponding to the reference region SR to be output.

This configuration in which the control unit 130 causes a notification sound corresponding to the reference region SR to be output makes it possible to perform an operation from a point that becomes a reference, and thus enables achievement of further accurate operations.

Note that, in the example illustrated in FIG. 16, the control unit 130 does not cause any notification sound to be output in a case where the operation object is not located at the reference region SR, while the control unit 130 may cause a notification sound to be output in such a way as to guide to the reference region SR. For example, in a case where slide operations in a predetermined direction are successively performed, employing a configuration that causes the operation object to return to the reference region SR after having performed a slide operation in a predetermined direction once and then perform a slide operation in the same direction again makes it possible to avoid a situation in which the operation object deviates from an operation region, and any other similar situation, thus enabling operations to be executed with further certainty. Note that the guidance to the reference region SR by the notification sound is achieved by, for example, such methods as illustrated in FIGS. 13 to 15. Further, the size of the reference region SR is not limited to such a size as illustrated in FIG. 16.

Meanwhile, in the example illustrated in FIG. 16, the reference region SR exists in a portion having been determined in advance. In this regard, however, for a user U having a habit of performing operations in only a biased portion in an operation area, the use of the reference region SR does not necessarily facilitate the operations. Thus, the user U may determine a portion at which the reference region SR is to be disposed. Specifically, for such a reference region SR, a portion which is located in an operation region and at which the user U first starts an operation may be determined as the reference region SR. This configuration enables achievement of further comfortable operations suitable for an operation habit of each of users U.

Note that the "portion at which an operation is first started" means, for example, a portion at which the operation object for executing one function is first located on an operation region, or the like. Alternatively, the "portion at which an operation is first started" may be, for example, a portion at which the operation object is first located on an operation region when a plurality of operations is successively performed. The definition of the "portion at which an operation is first started" is not limited to the above examples.

Here, an example of notification-sound output control associated with a reference region whose position is optionally determined, which is performed by the control unit 130 according to the present embodiment, will be described with reference to FIG. 17. FIG. 17 depicts diagrams that describe an example of notification-sound output control associated with a reference region whose position is optionally determined, which is performed by the control unit 130 according to the present embodiment. FIG. 17 illustrates the information processing terminal 10 serving as the headphone and worn by the user U.

In the left-hand area of FIG. 17, the hand H of the user U, which is the operation object, is first brought into contact with the touchpad. At this point, no reference region SR exists. Here, the control unit 130 determines a portion with which the hand H of the user U has first been brought into contact, as the reference region SR.

On the other hand, in the right-hand area of FIG. 17, the reference region SR having been determined by the control unit 130 is illustrated. Here, it is indicated by the recognized status that the hand H of the user U is located at the reference region SR, and thus, the control unit 130 causes a notification sound corresponding to the reference region SR to be output.

This configuration in which the control unit 130 determines the reference region SR at a time when the user U starts an operation using an operation region enables achievement of comfortable operations suitable for a habit of each of users U.

2.2.6. Specific Example 6

Heretofore, the specific examples of the case where the information processing terminal 10 is the headphone and one or more operation regions exist on the touchpad have been mainly described, but as described above, the information processing terminal 10 may be the earphone. The earphone serving as the information processing terminal 10 may include a touch sensor or a proximity sensor as the input unit 110. For the earphone whose size is smaller than that of the headphone, a situation sometimes arise in which operations by means of the touchpad are difficult, and thus, in-space operations by means of the proximity sensor may be suitable. In the description below, an example in which the earphone includes the proximity sensor as the input unit 110 will be described. The in-space position of the operation object is recognized by means of the proximity sensor.

Figure 18:
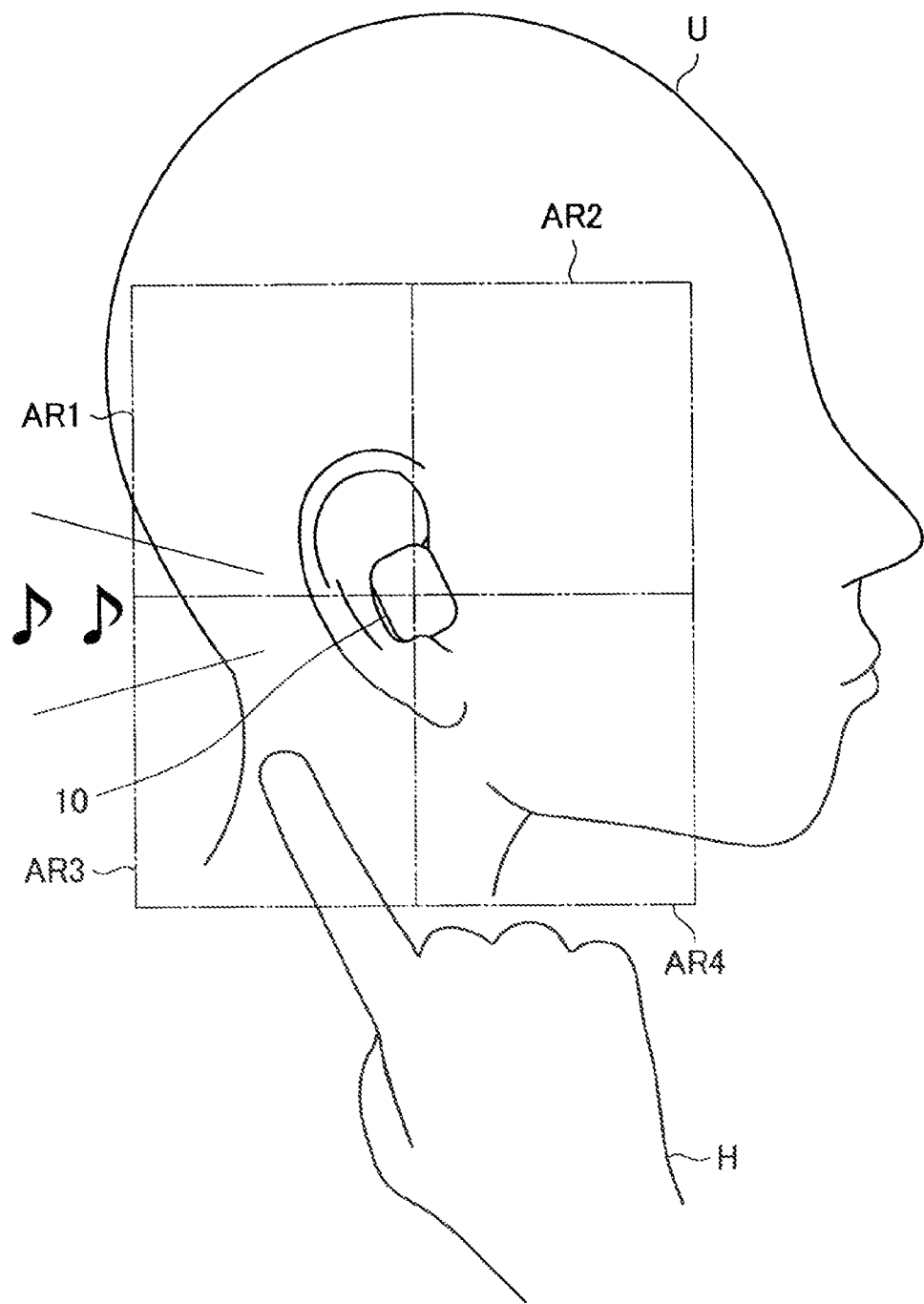
FIG. 18 is a diagram that describes an example of a case where operation regions exist in a space, according to the embodiment.

FIG. 18 is a diagram that describes an example of a case where operation regions exist in a space, according to the present embodiment. FIG. 18 illustrates the information processing terminal 10 serving as the earphone, and operation regions AR1 to AR4 existing in a space.

As illustrated in FIG. 18, the operation regions AR1 to AR4 exist in a three-dimensional space, not on the touchpad. In a case where the operation object exists in any one of the operation regions AR1 to AR4, the control unit 130 may control the output of a notification sound. Further, on the basis of a recognized status regarding the operation object that is executing a gesture in any one of the operation regions AR1 to AR4, the control unit 130 may dynamically control the output of notification information associated with a function corresponding to the gesture.

Further, in a case where operation regions exist in a space, the distance between the operation object and the information processing terminal 10 can be detected by the proximity sensor. Thus, in a case where a distance between the operation object and the information processing terminal 10 is indicated as the recognized status, the control unit 130 may perform notification-sound output control based on the distance.

FIG. 19 depicts diagrams that describe an example of a case where a distance between the operation object and the information processing terminal 10 is indicated as a recognized status and execution control of a function associated with the information processing terminal 10 is performed on the basis of the distance by the control unit 130 according to the present embodiment. FIG. 19 illustrates the information processing terminal 10 serving as the earphone, and the hand H of the user U.

As illustrated in the left-hand area of FIG. 19, the hand H of the user U and the information processing terminal 10 are spaced from each other by a distance D3. In a case where the recognized status indicates that, as illustrated in the right-hand area of FIG. 19, the hand H of the user U has approached a position spaced from the information processing terminal 10 by a distance D4, that is, in a case where the recognized status indicates that the hand H of the user U is executing a gesture for approaching the information processing terminal 10, the control unit 130 performs notification-sound output control based on a distance change from the distance D3 to the distance D4. In the example of FIG. 19, when the distance between the hand H of the user U and the information processing terminal 10 has changed from the distance D3 to the distance D4, the control unit 130 makes the sound volume of a notification sound output from the information processing terminal 10 large.

In addition to the above, the control unit 130 may control the output of the notification sound on the basis of whether or not the operation object is being located in an operation region. Specifically, the control unit 130 may control the output of the notification sound on the basis of whether or not the operation object is being located in a space where the detection by the input unit 110 is available.

Figure 20:
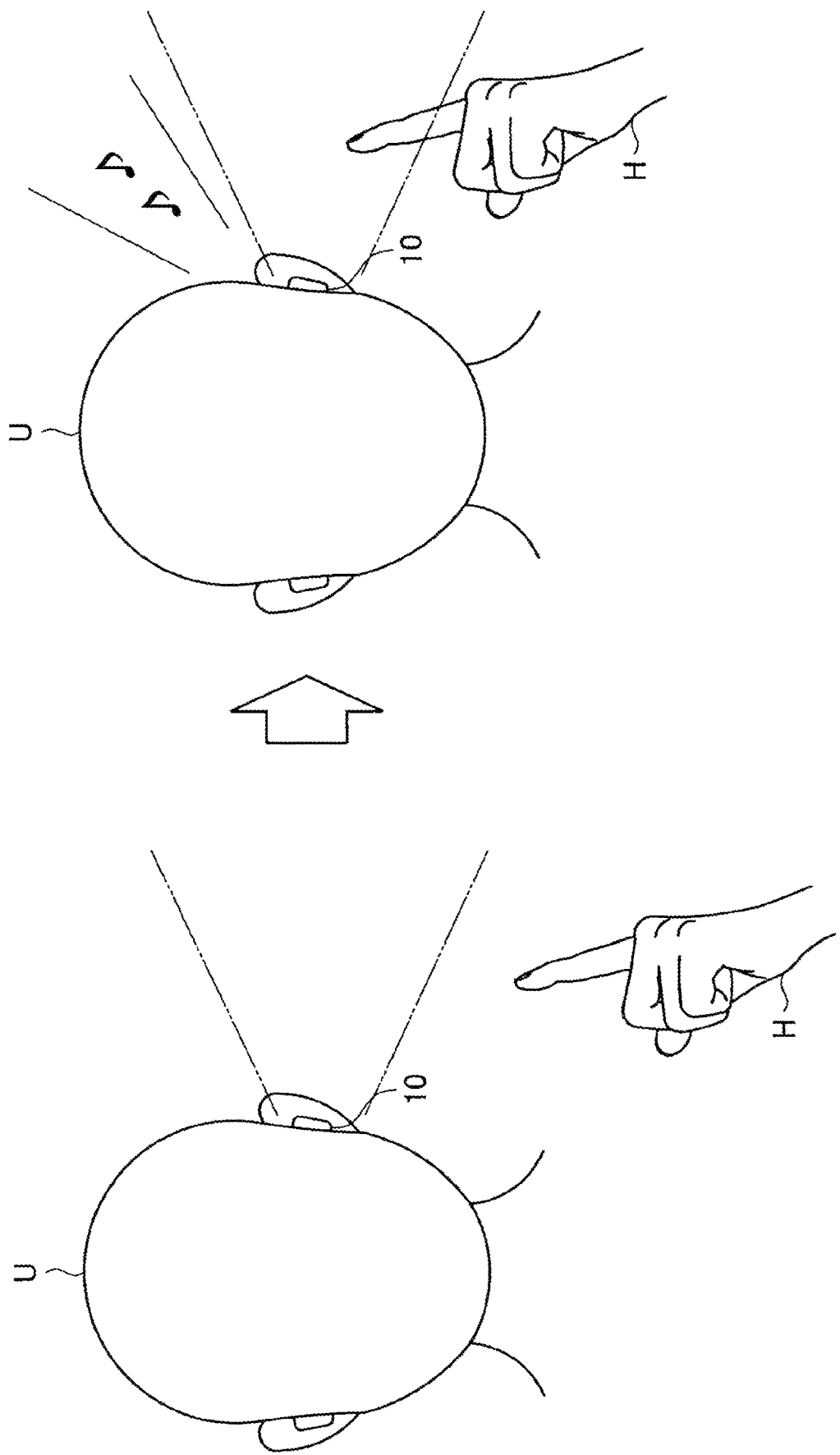
FIG. 20 depicts diagrams that describe an example in a case where an operation region exists in a space, which is performed by the control unit 130 according to the embodiment.

Here, an example of a case where an operation region is located in a space, is performed by the control unit 130 according to the present embodiment will be described with reference to FIG. 20. FIG. 20 illustrates the information processing terminal 10 serving as the earphone, and operation regions AR1 to AR4 existing in a space.

In the left-hand area of FIG. 20, the hand H of the user U, which is the operation object, is located outside a space serving as an operation region. The recognized status indicates that the hand H of the user U is located outside the space serving as the operation region, and thus, the control unit 130 does not cause any notification sound to be output.

On the other hand, the hand H of the user U is located inside the space serving as the operation region. The recognized status indicates that the hand H of the user U is located inside the space serving as the operation region, and thus, the control unit 130 causes a notification sound corresponding to the reference region SR to be output.

This configuration makes it possible to confirm whether or not the operation object is located inside a space serving as an operation region, thus enabling the user U to grasp an operation region that exists in a space and that the user U is unable to visually recognize.

Heretofore, the specific examples of notification-sound output control by the control unit 130 have been described. In the above description, the examples in which the information processing terminal 10 is the headphone or the earphone have been described, but the present disclosure is not limited to such examples. The information processing terminal 10 may be, for example, a touch panel for a vehicle. It is difficult for a driver to, while driving an automobile, visually recognize the touch panel for use in various operations. At such time, notifying the driver of information by means of notification sounds and/or vibrations by the information processing terminal 10 attached to the back side of a handle enables the driver to execute various operations.

Further, the information processing terminal 10 may be an autonomous vehicle or the like. A configuration in which, while a user U is executing gesture operations to an autonomous mobility, the autonomous mobility appropriately makes feedback by means of notification sounds and/or vibrations enables the user U to enjoy interactions with the autonomous mobility to a further degree. Further, the above-described technologies can be also applied to devices that provide VR (virtual Reality) content. A user U is often in a situation of being unable to visually recognize a controller or the like while using such VR content. Thus, the above-described technologies enable the user U to, while listening to notification sounds associated with operations for the controller, perform the operations further accurately.

3. OPERATION EXAMPLES

Figure 21:
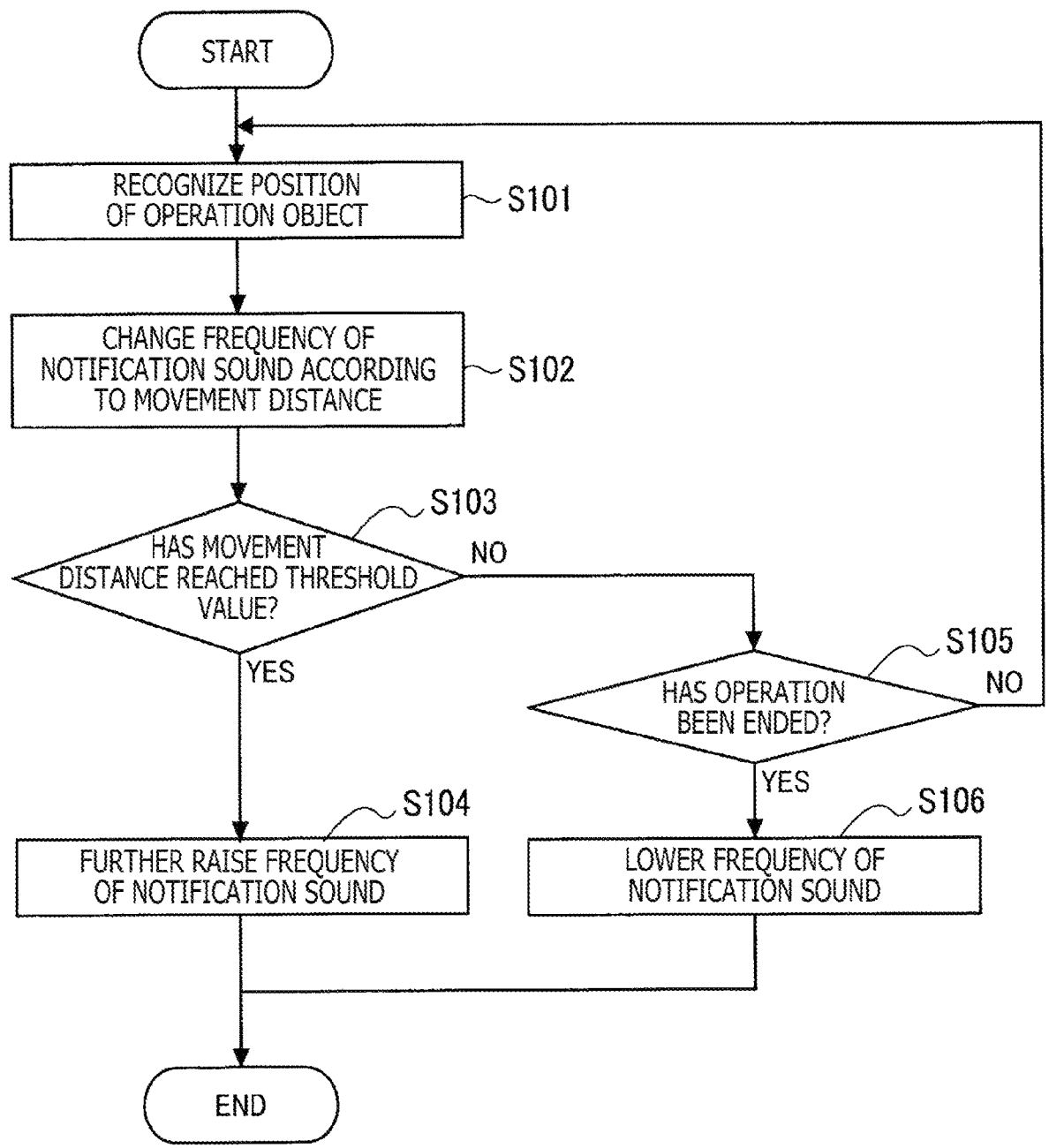
FIG. 21 is a diagram that describes an example of a flow of operation of notification-sound output control that is based on comparison of a movement distance of an operation object with a predetermined threshold value and that is performed by the control unit 130 according to the embodiment.
Figure 22:
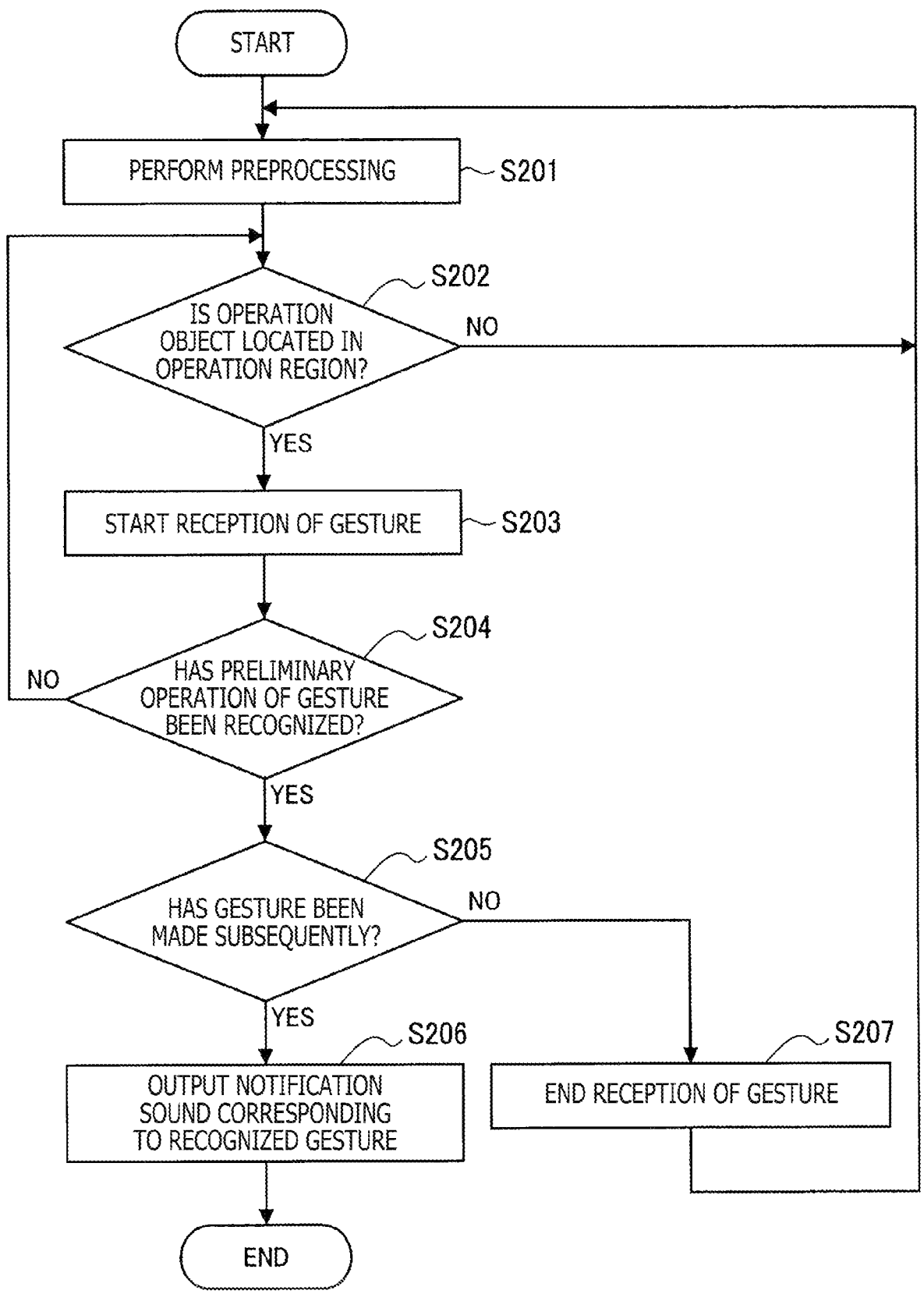
FIG. 22 is a diagram that describes an example of a flow of operation of notification-sound output control based on a gesture type, which is performed by the control unit 130 according to the embodiment.
Figure 23:
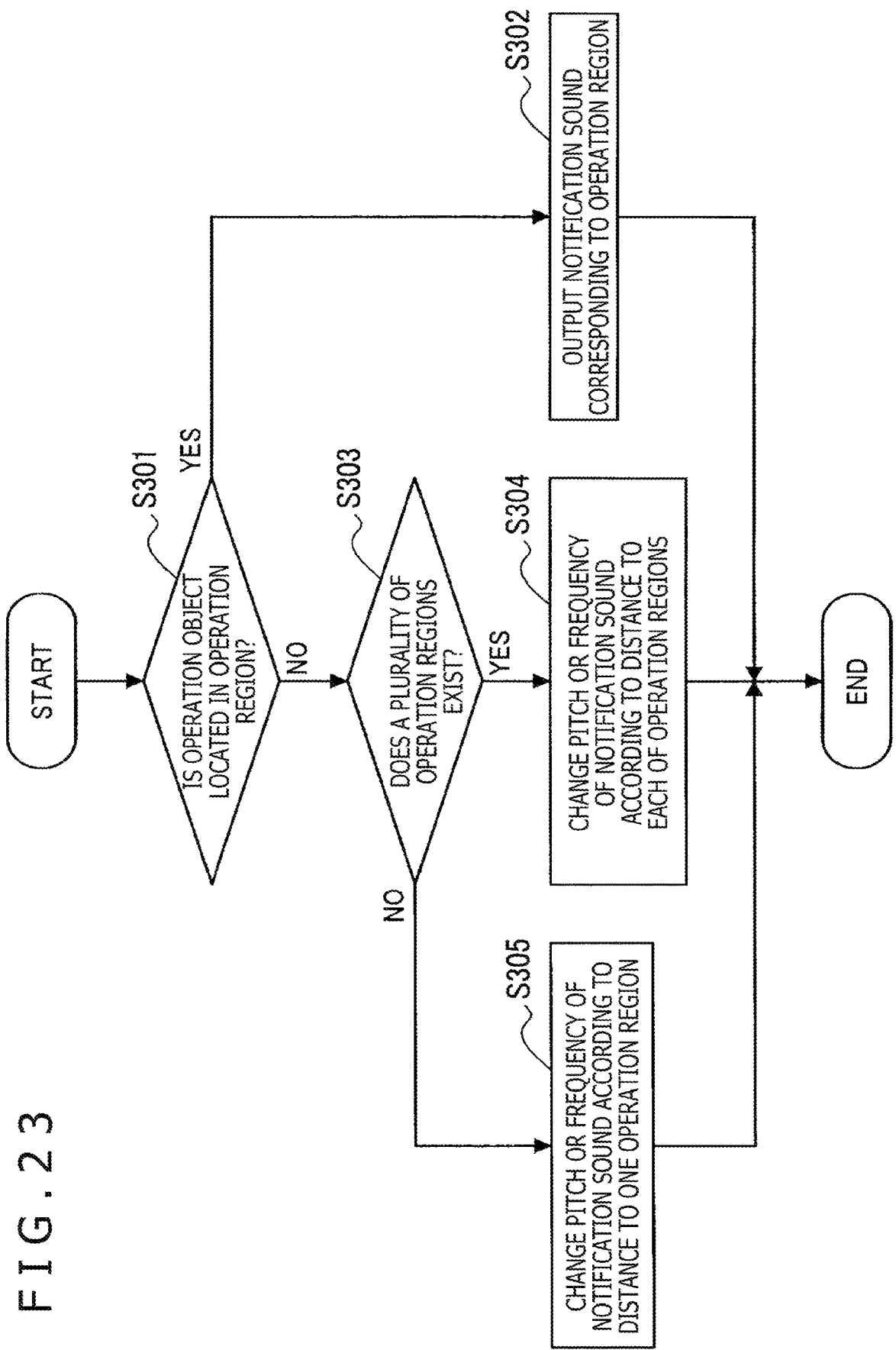
FIG. 23 is a diagram that describes an example of a flow of operation of the output control of a notification sound corresponding to an operation region, which is performed by the control unit 130 according to the embodiment.

Subsequently, the flows of operation of notification-sound output control performed by the control unit 130 according to the present embodiment will be described with reference to FIGS. 21 to 23.

First, an example of the flow of operation of notification-sound output control that is based on the comparison of a movement distance of the operation object with a predetermined threshold value and that is performed by the control unit 130 according to the present embodiment will be described with reference to FIG. 21. Referring to FIG. 21, first, the input unit 110 detects an operation object, and the recognition unit 120 recognizes the position of the detected operation object (S101). Next, the control unit 130 causes the pitch or frequency of a notification sound to be changed according to a movement distance of the operation object, which is based on the operation object's position having been recognized in step S101 (S102).

Next, in a case where the movement distance of the operation object, which is based on the operation object's position having been recognized in step S101, exceeds a predetermined threshold value (S103: YES), the control unit 130 raises the frequency of the notification sound (S104), and the information processing terminal 10 ends the operation. On the contrary, in a case where the movement distance of the operation object, which is based on the operation object's position having been recognized in step S101, does not exceed the predetermined threshold value (S103: NO) and the operation by the operation object has not been ended (S105: NO), the flow returns to step S101.

On the contrary, in the case where the movement distance of the operation object, which is based on the operation object's position having been recognized in step S101, does not exceed the predetermined threshold value (S103: NO) and the operation by the operation object has been ended (S105: YES), the control unit 130 lowers the frequency of the notification sound (S106), and the information processing terminal 10 ends the operation.

Subsequently, an example of the flow of operation of notification-sound output control based on a gesture type, which is performed by the control unit 130 according to the present embodiment, will be described with reference to FIG. 22. Referring to FIG. 22, first, the control unit 130 performs preprocessing in recognition processing for recognizing the operation object (S201). Next, in a case where the operation object is located in an operation range (S202: YES), the control unit 130 starts the reception of a gesture (S203).

Next, in a case where preliminary operation of a gesture has not been recognized by the recognition unit 120 (S204: NO), the flow returns to step S202. On the contrary, in a case where the preliminary operation of a gesture has been recognized (S204: YES) and it has been recognized that the gesture is being subsequently made after the preliminary operation of the gesture (S205: YES), the control unit 130 controls the output of a notification sound recognized in step S205 (S206), and the information processing terminal 10 ends the operation.

On the contrary, in the case where the preliminary operation of the gesture has been recognized by the recognition unit 120 (S204: YES) and it has not been recognized that the gesture is being subsequently made after the preliminary operation of the gesture (3205: NO), the control unit 130 ends the reception of a gesture (S207), and information processing terminal 10 returns to step S201.

Subsequently, an example of the flow of operation of the output control of a notification sound corresponding to an operation region, which is performed by the control unit 130 according to the present embodiment, will be described with reference to FIG. 23. Referring to FIG. 23, first, in a case where the operation object exists in an operation region (S301: YES), the control unit 130 causes a notification sound corresponding to the operation region to be output (S302), and the control unit 130 ends the operation.

On the contrary, in a case where the operation object does not exist in any operation region (S301: NO) and a plurality of operation regions exists (S303: YES), the control unit 130 causes the pitch or frequency of a notification sound to be changed according to distances from the operation object to the individual operation regions (S304), and the control unit 130 ends the operation. Further, on the contrary, in the case where the operation object does not exist in any operation region (S301: NO) and only one operation region exists (S303: NO), the control unit 130 causes the pitch or frequency of a notification sound to be changed according to a distance from the operation object to the one operation region (S305), and the control unit 130 ends the operation.

4. HARDWARE CONFIGURATION EXAMPLE

Next, a hardware configuration example of an information processing terminal 10 according to an embodiment of the present disclosure will be described. FIG. 24 is a block diagram illustrating a hardware configuration example of the information processing terminal 10 according to an embodiment of the present disclosure. Referring to FIG. 24, the information processing terminal 10 includes, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration indicated here is just an example, and a portion of the above constituent elements may be omitted. Further, one or more constituent elements other than the above constituent elements indicated here may be further included.

(Processor 871)

The processor 871 functions as, for example, an arithmetic processing device or a control device, and controls the entire or a portion of the operation of individual constituent elements on the basis of various kinds of programs recorded in the ROM 872, the RAM 873, the storage 880, or a removable recording medium 901.

(ROM 872 and RAM 873)

The ROM 872 is means that stores programs to be read into the processor 871, data used in arithmetic processing, and any other kind of data. The RAM 873 temporarily or permanently stores, for example, the programs to be read into the processor 871, various kinds of parameters that are changed as appropriate when the programs are executed, and the like.

(Host Bus 874, Bridge 875, External Bus 876, and Interface 877)

The processor 871, the ROM 872, the RAM 873 are coupled to one another via the host bus 874 capable of implementing, for example, high-speed data transmission. On the other hand, the host bus 874 is coupled to, for example, the external bus 876 having a relatively low-speed data transmission capability via the bridge 875. Further, the external bus 876 is coupled to various constituent elements via the interface 877.

(Input Device 878)

In the input device 878, for example, a mouse device, a keyboard, a touch panel, buttons, switches, levers, and the like are used. Moreover, as the input device 878, a remote controller (hereinafter referred to as remote control) capable of transmitting control signals by using infrared rays or any other kind of radio waves may be used. Furthermore, the input device 878 includes an audio input device such as a microphone.

(Output Device 879)

The output device 879 is a device capable of visually or audibly notifying a user of acquired information, and includes, for example, a display device such as a CRT (Cathode Ray Tube), an LCD, or an organic EL, audio output devices such as a speaker and a headphone, a printer, a mobile phone, a facsimile machine, and the like. Further, the output device 879 according to the present disclosure includes various vibration devices each capable of outputting a tactile stimulus.

(Storage 880)

The storage 880 is a device for storing various kinds of data. As the storage 880, for example, a magnetic storage device such as a hard disk drive (HDD), a semiconductor storage device, an optical storage device, a magneto-optical storage device, or the like is used.

(Drive 881)

The drive 881 is a device for reading information recorded in a removable recording medium 901 such as a magnetic disk, an optical disk, a magneto-optical disk, or a semiconductor memory, or writing information into the removable recording medium 901.

(Removable Recording Medium 901)

The removable recording medium 901 is, for example, a DVD medium, a Blu-ray (registered trademark) medium, an HD DVD medium, various kinds of semiconductor storage media, or the like. As a matter of course the removable recording medium 901 may be, for example, an IC card with a contactless IC chip, an electronic device, or the like.

(Connection Port 882)

The connection port 882 is a port for connecting to an external connection device 902, and is, for example, a USB (Universal Serial Bus) port, an IEEE 1394 port, an SCSI (Small Computer System Interface), an RS-232C port, an optical audio terminal, or the like.

(External Connection Device 902)

The external connection device 902 is, for example, a printer, a portable music player, a digital camera, a digital video camera, an IC recorder, or the like.

(Communication Device 883)

The communication device 883 is a communication device for connecting to a network, and is, for example, a communication card for a wired or a wireless LAN, Bluetooth (registered trademark), or WUSB (Wireless USB), a router for optical communication, a router for an ADSL (Asymmetric Digital Subscriber Line), a modem for various kinds of communication, or the like.

5. SUMMARY

As described above, the information processing terminal 10 according to the present embodiment enables a user to, in a region that the user is unable to visually recognize, confirm the success/failure of each of operations, and perform a wider variety of operations.

Heretofore, a preferred embodiment of the present disclosure has been described in detail referring to the accompanying diagrams, but the technical scope of the present disclosure is not limited to such examples. It is obvious that any person having a normal knowledge in the technical field of the present disclosure is able to conceive of various change examples or modification examples within the scope of the technical thought described in claims of the present description, and as a matter of course, it is to be understood that the change examples and modification examples also belong to the technical scope of the present disclosure.

Further, the effects having been described in the present description are just informative or exemplary ones, and do not limit other effects. That is, the technologies according to the present disclosure may bring about, in addition to or in substitution for the above-described effects, other effects that become obvious for those skilled in the art from the descriptions of the present description.

It should be noted that such configurations as described below also belong to the technical scope of the present disclosure.

(1)

An information processing device including:

a control unit that, on the basis of a position of a recognized operation object, dynamically controls output of an information associated with at least one operation region in which the recognized operation object is located, in which, in a case where the recognized operation object is located in the operation region, the control unit controls execution of a device function corresponding to the operation region in which the recognized operation object is located, and the operation region includes a region incapable of being visually recognized by a user.

(2)

The information processing device according to (1), in which, on the basis of the position of the recognized operation object, the control unit dynamically controls output of a sound associated with the operation region in which the recognized operation object is located.

(3)

The information processing device according to (2), in which, further on the basis of whether or not the position of the recognized operation object is in the operation region, the control unit dynamically controls the output of the sound.

(4)

The information processing device according to (3), in which the control unit dynamically controls the output of the sound in such a way as to guide the operation object to the operation region.

(5)

The information processing device according to any one of (2) to (4), in which, on the basis of the position of the recognized operation object relative to a reference region serving as a reference for an operation by the operation object, the control unit dynamically controls the output of the sound.

(6)

The information processing device according to (5), in which the control unit dynamically controls the output of the sound in such a way as to guide the recognized operation object to the reference region.

(7)

The information processing device according to (5) or (6), in which, in a case where the position of the recognized operation object is in the reference region, the control unit dynamically controls the output of the sound in such a way as to notify that the position of the recognized operation object is in the reference region.

(8)

The information processing device according to any one of (5) to (7), in which the control unit determines, as the reference region, the position of the recognized operation object at a time when the operation by the operation object is first started.

(9)

The information processing device according to any one of (2) to (8), in which, in a case where a plurality of the operation regions exists, the control unit dynamically controls output of a sound corresponding to each of the operation regions.

(10)

The information processing device according to (9), in which, in a case where the recognized operation object is moving, further on the basis of a movement direction of the recognized operation object, the control unit dynamically controls the output of the sound corresponding to each of the operation regions.

(11)

The information processing device according to any one of (2) to (10), in which, further on the basis of a position relation between the position of the recognized operation object and a position of each of the operation regions, the control unit dynamically controls output of a sound corresponding to each of the operation regions.

(12)

The information processing device according to (11), in which the position relation with each of the operation regions is a distance to each of the operation regions, and on the basis of the distance from the recognized operation object to each of the operation regions, the control unit dynamically controls the output of the sound corresponding to each of the operation regions.

(13)

The information processing device according to any one of (2) to (12), in which, in a case where a movement of the recognized operation object from an inside of the operation region to an outside of the operation region is predicted, the control unit dynamically controls the output of the sound in such a way as to notify of the predicted movement of the recognized operation object.

(14)

The information processing device according to any one of (2) to (13), in which, further on the basis of an in-space position relation between the recognized operation object and the information processing device, the control unit dynamically controls the output of the sound.

(15)

An information processing method including:

on the basis of a position of a recognized operation object, allowing a processor to dynamically control output of an information associated with at least one operation region in which the recognized operation object is located; and in a case where the recognized operation object is located in the operation region, allowing the processor to control execution of a device function corresponding to the operation region in which the recognized operation object is located, in which the operation region includes a region incapable of being visually recognized by a user.

(16)

A program for causing a computer to function as:

an information processing device including a control unit that, on the basis of a position of a recognized operation object, dynamically controls output of an information associated with at least one operation region in which the recognized operation object is located, the control unit being configured to, in a case where the recognized operation object is located in the operation region, control execution of a device function corresponding to the operation region in which the recognized operation object is located, and the operation region including a region incapable of being visually recognized by a user.

REFERENCE SIGNS LIST

10: Information processing terminal
110: Input unit
120: Recognition unit
130: Control unit
140: Output unit
150: Storage unit
160: Communication unit

The invention claimed is:

1. An information processing device comprising:
a control unit configured to, on a basis of a position of a recognized operation object, dynamically control output of information associated with at least one operation region in which the recognized operation object is located,
wherein, in a case where the recognized operation object is located in the operation region, the control unit is further configured to control execution of a device function corresponding to the operation region in which the recognized operation object is located,
the operation region includes a region incapable of being visually recognized by a user,
the control unit is further configured to dynamically control output of a first predetermined sound associated with a first operation region of the at least one operation region in which the recognized operation object is located on a basis of a first position of the recognized operation object and a second predetermined sound associated with a second operation region of the at least one operation region in which the recognized operation object is located on a basis of a second position of the recognized operation object, the second operation region being different than the first operation region, the second predetermined sound being different than the first predetermined sound, and the second recognized operation being different than the first recognized operation, and
the control unit is implemented via at least one processor.

2. The information processing device according to claim 1,
wherein, further on a basis of whether or not the position of the recognized operation object is in the operation region, the control unit is further configured to dynamically control the output of sound.

3. The information processing device according to claim 2,
wherein the control unit is further configured to dynamically control the output of the sound in such a way as to guide the operation object to the operation region.

4. The information processing device according to claim 1,
wherein, on a basis of the position of the recognized operation object relative to a reference region serving as a reference for an operation by the operation object, the control unit is further configured to dynamically control the output of sound.

5. The information processing device according to claim 2,
wherein the control unit is further configured to dynamically control the output of the sound in such a way as to guide the recognized operation object to the reference region.

6. The information processing device according to claim 2,
wherein, in a case where the position of the recognized operation object is in the reference region, the control unit is further configured to dynamically control the output of the sound in such a way as to notify that the position of the recognized operation object is in the reference region.

7. The information processing device according to claim 2,
wherein the control unit is further configured to determine, as the reference region, the position of the recognized operation object at a time when the operation by the operation object is first started.

8. The information processing device according to claim 1,
wherein, in a case where a plurality of the operation regions exists, the control unit is further configured to dynamically control output of a different sound corresponding to each operation region of the plurality of operation regions.

9. The information processing device according to claim 8,
wherein, in a case where the recognized operation object is moving, further on a basis of a movement direction of the recognized operation object, the control unit is further configured to dynamically control the output of the different sound corresponding to each operation region of the plurality of operation regions.

10. The information processing device according to claim 1,
wherein, further on a basis of a position relation between the position of the recognized operation object and a position of each of the operation regions, the control unit is further configured to dynamically control output of a sound corresponding to each of the operation regions.

11. The information processing device according to claim 10,
wherein the position relation with each of the operation regions is a distance to each of the operation regions, and on a basis of the distance from the recognized operation object to each of the operation regions, the control unit is further configured to dynamically control the output of the sound corresponding to each of the operation regions.

12. The information processing device according to claim 1,
wherein, in a case where a movement of the recognized operation object from an inside of the operation region to an outside of the operation region is predicted, the control unit is further configured to dynamically control the output of sound in such a way as to notify of the predicted movement of the recognized operation object.

13. The information processing device according to claim 1,
wherein, further on a basis of an in-space position relation between the recognized operation object and the information processing device, the control unit is further configured to dynamically control the output of sound.

14. An information processing method comprising:
dynamically controlling, on a basis of a position of a recognized operation object, output of information associated with at least one operation region in which the recognized operation object is located;
controlling, in a case where the recognized operation object is located in the operation region, execution of a device function corresponding to the operation region in which the recognized operation object is located, wherein the operation region includes a region incapable of being visually recognized by a user; and dynamically controlling output of a first predetermined sound associated with a first operation region of the at least one operation region in which the recognized operation object is located on a basis of a first position of the recognized operation object and a second predetermined sound associated with a second operation region of the at least one operation region in which the recognized operation object is located on a basis of a second position of the recognized operation object, the second operation region being different than the first operation region, the second predetermined sound being different than the first predetermined sound, and the second recognized operation being different than the first recognized operation.

15. A non-transitory computer-readable medium having embodied thereon a program, which when executed by a computer causes the computer to execute an information processing method, the method comprising:

dynamically controlling, on a basis of a position of a recognized operation object, controls output of information associated with at least one operation region in which the recognized operation object is located;

controlling, in a case where the recognized operation object is located in the operation region, execution of a device function corresponding to the operation region in which the recognized operation object is located, wherein the operation region includes a region incapable of being visually recognized by a user; and dynamically controlling output of a first predetermined sound associated with a first operation region of the at least one operation region in which the recognized operation object is located on a basis of a first position of the recognized operation object and a second predetermined sound associated with a second operation region of the at least one operation region in which the recognized operation object is located on a basis of a second position of the recognized operation object, the second operation region being different than the first operation region, the second predetermined sound being different than the first predetermined sound, and the second recognized operation being different than the first recognized operation.

* * * * *